US010649416B2

(12) United States Patent
Matsushima et al.

(10) Patent No.: US 10,649,416 B2
(45) Date of Patent: May 12, 2020

(54) MACHINE LEARNING MODEL CONSTRUCTION DEVICE, NUMERICAL CONTROL, MACHINE LEARNING MODEL CONSTRUCTION METHOD, AND NON-TRANSITORY COMPUTER READABLE MEDIUM ENCODED WITH A MACHINE LEARNING MODEL CONSTRUCTION PROGRAM

(71) Applicant: FANUC CORPORATION, Yamanashi (JP)

(72) Inventors: Takahiko Matsushima, Yamanashi (JP); Yoshito Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 447 days.

(21) Appl. No.: 15/648,753

(22) Filed: Jul. 13, 2017

(65) Prior Publication Data
US 2018/0024510 A1 Jan. 25, 2018

(30) Foreign Application Priority Data

Jul. 22, 2016 (JP) ................................. 2016-144923

(51) Int. Cl.
G06N 3/063 (2006.01)
G05B 13/02 (2006.01)
(52) U.S. Cl.
CPC ........... G05B 13/027 (2013.01); G06N 3/063 (2013.01)
(58) Field of Classification Search
CPC .............................. G05B 13/027; G06N 3/063
See application file for complete search history.

(56) References Cited

U.S. PATENT DOCUMENTS 5,473,532 A * 12/1995 Unno ............... G05B 19/40937
700/32
10,095,718 B2 * 10/2018 Birdwell ................. G06F 16/22
2008/0319933 A1 * 12/2008 Moussa .................. G06N 3/063
706/31

(Continued)

FOREIGN PATENT DOCUMENTS

JP          4-663       1/1992
JP          4-256158    9/1992
JP          5-89247     4/1993

(Continued)

OTHER PUBLICATIONS

Rosado-Muñoz, Alfredo, et al. "An IP core and GUI for implementing multilayer perceptron with a fuzzy activation function on configurable logic devices." Journal of Universal Computer Science 14.10 (2008): 1678-1694. (Year: 2008).*
Skodzik, Jan, et al. "A highly integrable fpga-based runtime-configurable multilayer perceptron." 2013 IEEE 27th International Conference on Advanced Information Networking and Applications (AINA). IEEE, 2013. (Year: 2013).*
Omondi, Amos R., and Jagath Chandana Rajapakse, eds. FPGA implementations of neural networks. vol. 365. Dordrecht, The Netherlands: Springer, 2006. (Year: 2006).*

(Continued)

Primary Examiner — Hal Schnee
(74) Attorney, Agent, or Firm — Wenderoth, Lind & Ponack, L.L.P.

(57) ABSTRACT

Various neural network models are constructed flexibly on a learning circuit. A machine learning model construction device includes a learning circuit (80) capable of constructed a neural network model according to a setting value, and a control means (11) capable of adjusting the setting value so as to become a value for constructing a predetermined neural network model in the learning circuit (80).

9 Claims, 16 Drawing Sheets

(56) References Cited

U.S. PATENT DOCUMENTS

2017/0024644 A1* 1/2017 Van Der Made ...... G06N 3/063
2017/0330069 A1* 11/2017 Liu ........................ G06N 3/04

FOREIGN PATENT DOCUMENTS

| | | |
|---|---|---|
| JP | 5-217010 | 8/1993 |
| JP | 6-314105 | 11/1994 |
| JP | 7-28768 | 1/1995 |
| JP | 8-235145 | 9/1996 |
| JP | 9-91263 | 4/1997 |
| JP | 9-120434 | 5/1997 |
| JP | 2001-51968 | 2/2001 |
| JP | 2008-533615 | 8/2008 |
| WO | 2006/099429 | 9/2006 |
| WO | 2010/106587 | 9/2010 |

OTHER PUBLICATIONS

Upegui, Andres, Carlos Andrés Pena-Reyes, and Eduardo Sanchez. "An FPGA platform for on-line topology exploration of spiking neural networks." Microprocessors and microsystems 29.5 (2005): 211-223. (Year: 2005).*

Vainbrand, Dmitri, and Ran Ginosar. "Scalable network-on-chip architecture for configurable neural networks." Microprocessors and Microsystems 35.2 (2011): 152-166. (Year: 2011).*

Chen, Jenq-Shyong. "Neural network-based modelling and error compensation of thermally-induced spindle errors." The International Journal of Advanced Manufacturing Technology 12.4 (1996): 303-308. (Year: 1996).*

Chen, Jenq Shyong, and Cheng Chang Ling. "Improving the machine accuracy through machine tool metrology and error correction." The International Journal of Advanced Manufacturing Technology 11.3 (1996): 198-205. (Year: 1996).*

* cited by examiner

FIG. 6 SHOW REPRESENTATIVE STRUCTURE EXAMPLE OF NEURAL NETWORK MODEL

MACHINE LEARNING MODEL CONSTRUCTION DEVICE, NUMERICAL CONTROL, MACHINE LEARNING MODEL CONSTRUCTION METHOD, AND NON-TRANSITORY COMPUTER READABLE MEDIUM ENCODED WITH A MACHINE LEARNING MODEL CONSTRUCTION PROGRAM

This application is based on and claims the benefit of priority from Japanese Patent Application No. 2016-144923, filed on 22 Jul. 2016, the content of which is incorporated herein by reference.

BACKGROUND OF THE INVENTION

Field of the Invention

The present invention relates to a machine learning model construction device, numerical control, machine learning model construction method, machine learning model construction program, and recording medium for performing processing related to the construction of a machine learning model.

Related Art

By performing machine learning, it is expected to raise the precision of image recognition, etc. Herein, a neural network can be given as a representative method of machine learning. In a case of applying a neural network, it becomes important to construct the model of an appropriate neural network according to the problem sought to be solved. This is because the precision of the output will drop in the case of not being an appropriate neural network model.

Technology related to the construction, etc. of such a neural network model has been disclosed in Patent Document 1, Patent Document 2 and Patent Document 3, for example. First, Patent Document 1 discloses tool for performing learning by executing script commands setting various parameters in a neural network that does not perform machine learning. In addition, Patent Document 2 discloses technology of dividing a large-scale neural network into blocks of every functional unit, setting the number of neurons and connection rules for each block as parameters, and automatically creating a neural network based on the values thereof. Furthermore, Patent Document 3 discloses a method of outputting an optimum neuron number by analyzing the output of each neuron after learning of the neural network.

Patent Document 1: Japanese Unexamined Patent Application (Translation of PCT Application), Publication No. 2008-533615

Patent Document 2: Japanese Unexamined Patent Application, Publication No. 2001-051968

Patent Document 3: Japanese Unexamined Patent Application, Publication No. H08-235145

SUMMARY OF THE INVENTION

As mentioned above, each patent document describes technology related to the construction of a neural network model. In this point, although it is important to construct the appropriate neural network model according to the problem to be solved in machine learning as mentioned above, since expertise is demanded in the model construction work, there is a problem in that it is not easy for a user to finally arrive at the appropriate model. In addition, since the problem to be solved differs according to the individual user, the appropriate neural network will also differ for individual users; therefore, there is a problem in that there is no flexibility in preparing in advance a learning circuit having a specifically targeted neural network model.

However, it has not been possible to sufficiently solve these problems with the configurations disclosed in the respective patent documents. For example, Patent Document 1 mentions a method of displaying the connection relationship of a neural network as a function of assisting script creation; however, it is not necessarily possible to set the structure itself of the neural network model thereby. In addition, by using the technology disclosed in Patent Document 2 or Patent Document 3, it may be possible to prepare in advance a learning circuit having a specifically targeted neural network model. However, even if trying to use these technologies, it would not be possible to flexibly construct various neural network models on a learning circuit suited to each of the problems to be solved which differ for every user.

Therefore, the present invention has an object of providing a machine learning model construction device, numerical control, machine learning model construction method, machine learning model construction program, and recording medium capable of flexibly constructing various neural network models on a learning circuit.

A machine learning model construction device according to a first aspect of the present invention is a machine learning model construction device including: a learning circuit (for example, the learning circuit 80 described later) capable of constructing a neural network model according to a setting value (for example, the setting value $S_{ij}$ described later); and a control means (for example, the CPU 11 described later) for adjusting the setting value so as to be a value for constructing a predetermined neural network model in the learning circuit.

According to a second aspect of the present invention, in the machine learning model construction device as described in the first aspect, it may be configured so that the control means receives input of a parameter value, defines a neural network model corresponding to the received parameter value as the predetermined neural network model, and adjusts the setting value so as to be a value for constructing the predetermined neural network model in the learning circuit.

According to a third aspect of the present invention, in the machine learning model construction device as described in the second aspect, it may be configured so that the received parameter value is a value (for example, $N_{layer}$ and $N_{dim,j}$ described later) designating a layer number of the neural network model and a dimension number of each layer.

According to a fourth aspect of the present invention, in the machine learning model construction device as described in the second or third aspect, it may be configured so that the control means reads the parameter value from a setting file (for example, the CSV file described later).

According to a fifth aspect of the present invention, in the machine learning model construction device as described in any one of the second to fourth aspects, it may be configured so that the control means draws a connection relationship of perceptrons according to the parameter value, and a graphical user interface for performing adjustment of the parameter value while a user references the connection relationship of the perceptrons, on a display means (for example, the display/MDI unit 70 described later).

According to a sixth aspect of the present invention, in the machine learning model construction device as described in any one of the first to fifth aspects, it may be configured so that the control means allows a user to select a neural network model prepared in advance, defines the neural network model selected as the predetermined neural network model, and adjusts the setting value so as to be a value for constructing the predetermined neural network model in the learning circuit.

According to a seventh aspect of the present invention, in the machine learning model construction device as described in any one of the first to sixth aspects, it may be configured so that the control means constructs a neural network model in the learning circuit by way of controlling output of each perceptron included in the learning circuit according to the setting value.

According to a eighth aspect of the present invention, in the machine learning model construction device as described in the seventh, it may be configured so that controlling output of each perceptron included in the learning circuit according to the setting value includes setting output of a multiplier within each perceptron included in the learning circuit according to the setting value, as any value among a value (for example, $Y_w$ described later) arrived at by multiplying a weighting value by input of the multiplier, a value (for example, $Y_{in}$ described later) as inputted to the multiplier, and a value (for example, $Y_0$ described later) of zero, and sets a sum of outputs of multipliers within each perceptron as an output (for example, Y accompanied by a two-digit subscript described later) of each perceptron.

A numerical control (for example, the numerical control 100 described later) according to a ninth aspect of the present invention is a numerical control for controlling a machine tool (for example, the servomotor 50 to 54 described later), including the above-mentioned machine learning model construction device, in which the control means receives input of a parameter value for constructing a neural network model that is related to control of the machine tool in the learning circuit, sets a neural network model corresponding to the received parameter value as the predetermined neural network model, and adjusts the setting value so as to be a value for constructing the predetermined neural network model in the learning circuit.

A machine learning model construction program according to a tenth aspect of the present invention is a machine learning model construction program for causing a computer to function as a machine learning construction device, including: a learning circuit capable of constructing a neural network model according to a setting value; and a control means for adjusting the setting value so as to be a value for constructing a predetermined neural network model in the learning circuit.

A recording medium according to an eleventh aspect of the present invention is a computer readable recording medium recording the above-mentioned machine learning model construction program.

A method of constructing a machine learning model according to a twelfth aspect of the present invention is a method of constructing a machine learning model performed by a machine learning model construction device including a learning circuit capable of constructing a neural network model according to a setting value, the method including: a step of controlling to adjust the setting value so as to be a value for constructing a predetermined neural network model in the learning circuit.

According to the present invention, it is possible to flexibly construct various neural network models on a learning circuit.

DETAILED DESCRIPTION OF THE INVENTION

First, an outline of an embodiment of the present invention will be explained. As a learning circuit, the embodiment of the present invention prepares a learning circuit including a sufficient number of perceptrons for constructing any neural network model, which can change the number of perceptrons used according to the neural network model actually constructed. In addition, a user interface assisting the setting operation for various parameters is provided to the user. The user can easily perform setting operations of various parameters, by way of graphical editing operations using such a user interface. Then, the neural network model is constructed based on the various parameters set by the user, and this neural network model is reflected instantly in a learning circuit.

A learning circuit corresponding to various neural network models can thereby be flexibly constructed. In other words, it is possible to solve the aforementioned (Problem to be solved by the invention) by way of the present embodiment. The above is an outline of an embodiment of the present invention.

Next, an embodiment of the present invention will be explained in detail by referencing the drawings. When referencing FIG. 1, a machine learning model construction system, which is the present embodiment, includes a plurality of numerical controls (CNC: Computer Numerical Control) 100, and a host system 200 that manages this plurality of numerical controls 100.

The plurality of numerical controls 100 are connected with a machine tool (omitted from illustration) such as a servomotor serving as the control target of each, and controls these machine tools. In addition, the plurality of numerical controls 100 respectively includes a learning circuit 80.

Figure 1:
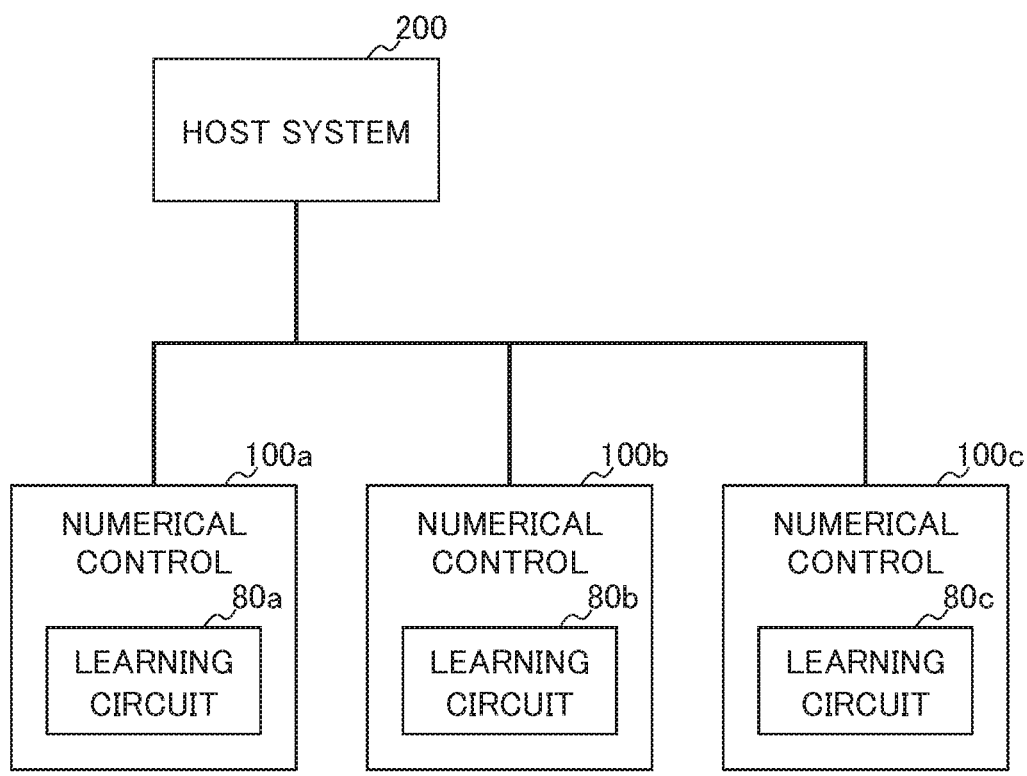
FIG. 1 is a diagram expressing the basic configuration of the overall embodiment of the present invention.

In the present embodiment, not the host system 200, but rather each of the plurality of numerical controls 100 performs processing for neural network model construction, thereby constructing various neural network models in the learning circuit 80 possessed by the respective numerical controls 100 themselves. Herein, it is assumed that not the numerical controls 100, but rather the host system 200 includes the learning circuit 80, and performs the processing for construction of such neural network models. In this case, the numerical control 100 forwards the input of the learning circuit 80 to the host system 200, and the host system 200 forwards the output of the learning circuit 80 to the numerical control 100. The time required in forwarding becomes a bottleneck, and there is a possibility of difficulty in reflecting the output results of the learning circuit 80 in real-time. For this reason, the present embodiment prepares the learning circuit 80 hardwired into each numerical control 100 on the edge side, as shown in FIG. 1, and tries to perform processing for construction of the neural network model in each numerical control 100 on the edge side.

In addition, the present embodiment constructs a neural network model for image recognition of a subject or tool serving as the target to perform work with the machine tool, for example. In this case, with the constructed neural network, the image data captured by a camera is inputted, and the likelihood of the captured object being the subject or tool is outputted. Besides, it constructs a neural network model for detecting an indication of abnormality occurrence before an abnormality occurring in the machine tool, etc. In this case, with the constructed neural network, the measured value measured by each of the plurality of sensors is inputted, and the likelihood of abnormality occurring subsequently is outputted.

Next, functional blocks possessed by the plurality of numerical controls 100 will be explained in detail by referencing FIG. 2. It should be noted that the plurality of numerical controls 100 (numerical control 100a, numerical control 100b and numerical control 100c) each have equivalent functions; therefore, hereinafter an explanation is made by simply calling these as numerical controls 100 without distinguishing. Herein, the numerical control 100 of the present embodiment not only functions as a general numerical control that directly controls the machine tool, but also functions as a machine learning model construction device that constructs a neural network model.

Figure 2:
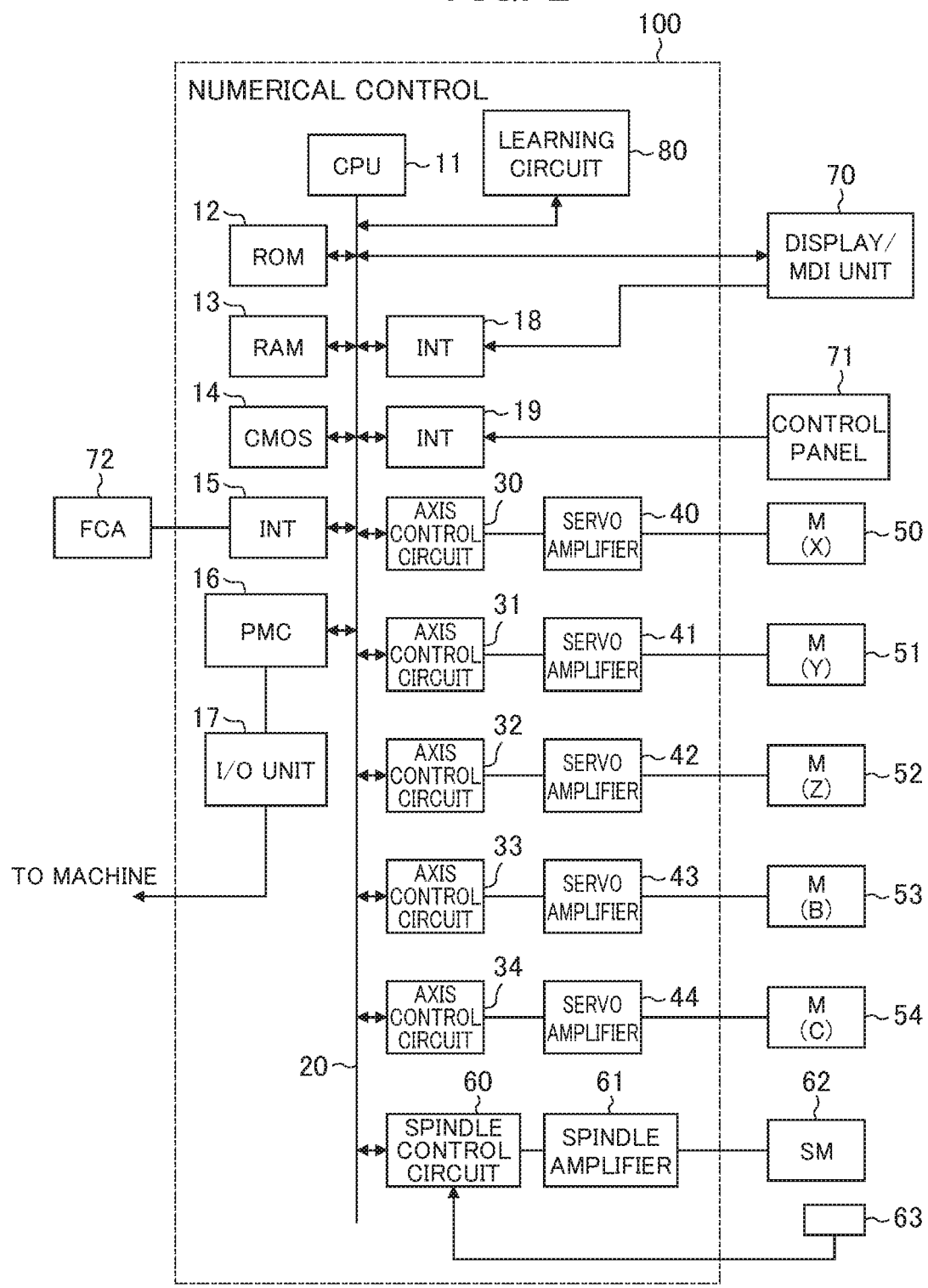
FIG. 2 is a diagram expressing the basic configuration of a numerical control of an embodiment of the present invention.

When referencing FIG. 2, the numerical control 100 includes a CPU 11, ROM 12, RAM 13, CMOS memory 14, interface 15, PMC 16, I/O unit 17, interface 18, interface 19, data communication bus 20, axis control circuits 30 to 34, servo amplifiers 40 to 44, servomotors 50 to 54, spindle control circuit 60, spindle amplifier 61, spindle motor 62, pulse encoder 63, display/MDI unit 70, external device 72, and learning circuit 80. Hereinafter, each of these functional blocks will be explained.

The CPU 11 is a processor that functions as a control unit which entirely controls the numerical control 100. The ROM 12 is a storage device which saves various programs. Herein, the various programs stored in the ROM 12 are a program for realizing a function as a general numerical control, and a program for realizing processing for the construction of the neural network of the present embodiment. Program for realizing the processing for construction of the neural network of the present embodiment, for example, is a program for realizing various functions such as the function of providing a user interface for a user to input parameter values, the function of calculating setting values which are values for constructing the neural network model in the learning circuit 80, and the function for actually causing the neural network model to be constructed in the learning circuit 80 based on the calculated setting values.

Then, in the present embodiment, the CPU 11 reads out programs stored in the ROM 12 via the data communication bus 20, and performs operations based on the read programs, while expanding the read programs in the RAM 13. Then, the CPU 11 realizes the functions of the present embodiment, by controlling hardware included in the numerical control 100 based on the operation results. In other words, the present embodiment can be realized by way of hardware and software cooperating.

Temporary calculation data of the operational processing performed by the CPU 11, display data, and various data inputted by the user via the interface 15 and display/MDI unit 70 are stored in the RAM 13. Herein, various data inputted by the user via the interface 15 and display/MDI unit 70 is a variety of parameters for constructing a neural network model, for example.

The CMOS memory 14 is backed up by a battery (not illustrated), and is configured as non-volatile memory for which the stored state is maintained even when the power source of the numerical control 100 is turned OFF. A processing program read out via the interface 15, a processing program inputted via the display/MDI unit 70, etc. are stored in the CMOS memory 14. As a part of the aforementioned system program, various system programs for implementing the processing of an edit mode necessitated for creation and editing of the processing program, and processing for automatic operation are also written in the ROM 12. These various processing programs can be inputted via the interface 15 or display/MDI unit 70, and be stored in the CMOS memory 14.

The interface 15 enables connection between the numerical control 100 and external device 72 such as an adapter. The processing program, various parameters, etc. are read from the external device 72 side. In addition, the processing program edited in the numerical control 100 can be stored in an external storage means via the external device 72.

The PMC (programmable machine controller) 16 is a device generally called a PLC (programmable logic controller). The PMC 16 outputs signals via the I/O unit 17 to auxiliary equipment of the machine tool (e.g., actuator such as robot hand for tool change) to control by a sequence program built into the numerical control 100. In addition, after receiving signals of various switches or the like of a control panel deployed to the main body of the machine tool, and doing the required signal processing, it is handed over to the CPU 11.

The display/MDI unit 70 is a manual data input device including a display, keyboard, etc., and the interface 18 receives commands and data from the keyboard of the display/MDI unit 71, and hands over to the CPU 11. The interface 19 is connected to the control panel 71 including a manual pulse generator, etc.

The axis control circuits 30 to 34 of each axis receive a movement command amount of each axis from the CPU 11, and output the command of each axis to the servo amplifiers 40 to 44.

The servo amplifiers 40 to 44 receive these commands, and drive the servomotors 50 to 54 of each axis. The servomotors 50 to 54 of each axis have built in position/speed detectors, feed back the position/speed feedback signals from these position/speed detectors to the axis control circuits 30 to 34, and perform position/speed feedback control. It should be noted that, in the block diagram, the position/speed feedback is omitted.

The spindle control circuit 60 receives a main shaft rotation command to the machine tool, and outputs the spindle speed signal to the spindle amplifier 61. The spindle amplifier 61 receives this spindle speed signal, causes the spindle motor 62 of the machine tool to rotate at the commanded rotation speed to drive the tool.

The pulse encoder 63 couples by gears, a belt or the like with the spindle motor 62, and the pulse encoder 63 outputs a return pulse synchronously with the rotation of the main shaft, and this return pulse is read by the CPU 11 through the data communication bus 20.

The learning circuit 80 is a learning circuit including a sufficient number of perceptrons for constructing any neural network model, which is a learning circuit capable of changing the number of perceptrons used according to the neural network model to actually construct. The learning circuit 80 receives the setting values form the CPU 11 via the data communication bus 20, and constructs a neural network model corresponding to the received setting values. It should be noted that the learning circuit 80 and CPU 11 are connected via the data communication bus 20 similarly to other functional blocks in the drawing; however, it may be configured so as to provide a dedicated data communication bus other than the data communication bus 20 to connect the learning circuit 80 and CPU 11.

Next, the configuration of the learning circuit 80 will be explained by referencing FIG. 3. When referencing FIG. 3, the learning circuit 80 includes an input unit 81, output unit 82, weighting storage unit 83, setting value storage unit 84, and perceptron circuit 85.

The input unit 81 retains the input values for machine learning. The input values are feature amounts expressing a feature of each pixel in an image serving as an analysis target, or a measured value measured by each of a plurality of sensors, for example. These input values are inputted to these storage units from the CPU 11 and plurality of sensors. Then, the input values retained by the input unit 81 are inputted to each perceptron of a first layer included in the perceptron circuit 85.

The weighting storage unit 83 stores weighting information used in operations of machine learning performed by the perceptron circuit 85. In addition, the setting value storage unit 84 stores setting value information for constructing neural network models of the perceptron circuit 85. This weighting information and setting value information is inputted to these storage units from the CPU 11. Then, the information stored by these storage units is inputted to each perceptron included in the perceptron circuit 85.

The perceptron circuit 85 is a circuit including only a sufficient number of perceptrons for constituting any neural network model. It should be noted that, in the following explanation, each perceptron is indicated by "P accompanied by two-digit subscript". In addition, each drawing including FIG. 3 indicates the respective perceptrons by "encircled character P accompanied by two-digit subscript". The first character of the subscript of this P expresses the dimension number of this perceptron, and the second character of the subscript expresses the layer number of this perceptron. For example, for $P_{21}$, it expresses being in the first layer and being a two dimensional perceptron.

Figure 3:
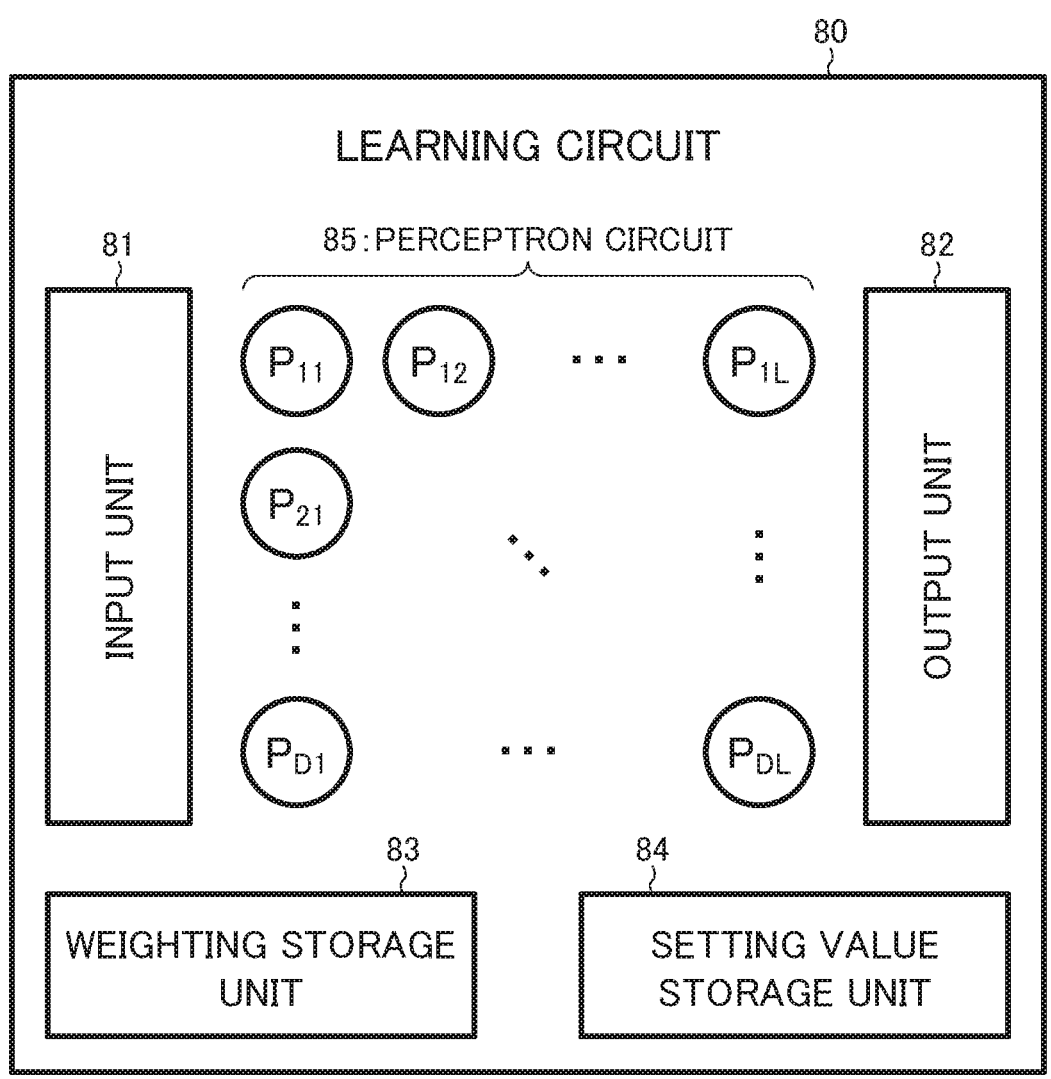
FIG. 3 is a diagram expressing the basic configuration of a learning circuit of an embodiment of the present invention.

Currently, in FIG. 3, the layer number is up to L, and the dimension number is up to D. Although values of the layer number L and dimension number D, for example, in the case of performing image recognition by the neural network model constructed in the percentage circuit 85, the value of the layer number L is generally about L=20-30. In addition, in this case, the value of the dimension number D is generally about D=100,000 to 1,000,000. However, these values are ultimately only examples, and may be different values. For example, by enlarging the value of D (i.e. by increasing the dimension number of the perceptron and increasing the number of input values that can be simultaneously inputted), it may be configured so as to perform image recognition with an image exceeding 1,000,000 pixels as the target. In other words, L and D may be any natural number.

Each perceptron included in the perceptron circuit 85 performs operation of mechanical learning using the weighting information stored by the weighting storage unit 83. In addition, each perceptron included in the perceptron circuit 85 has a function enabling to adjust the output based on the setting value information stored by the setting value storage unit 84, and constitutes any neural network model by way of the function of adjusting this output.

The output unit 83 calculates a final output by the activation function from the output of each perceptron in the $L^{th}$ layer included in the perceptron circuit 85.

It should be noted that illustration of the connection relationship is omitted from the drawings in consideration of ease of viewing illustrations. Understandably, in practice, each perceptron of the first layer included in the perceptron circuit 85 is connected with the input unit 81, and each perceptron of the $L^{th}$ layer is connected with the output unit 83. In addition, each perceptron is connected with the weighting storage unit 83 and setting value storage unit 84, respectively.

In addition, the respective perceptrons are also connected. Next, the connection relationship between respective perceptrons included in the perceptron circuit 85 will be explained by referencing FIG. 4. This time, an explanation is made assuming that the layer number and dimension number of perceptrons included in the perceptron circuit 85 overall are smaller numbers than the aforementioned general numbers for simplifying explanation. Specifically, it is explained with the layer number of 3 and dimension number of 3 for the perceptrons included in the perceptron circuit 85 overall. However, the present embodiment not being limited to such a layer number or dimension number is as mentioned above.

In the perceptron circuit 85, the output of each perceptron is connected to all of the perceptrons of the next layer. For example, the output of $P_{11}$ of the first layer is connected to each of $P_{12}$, $P_{22}$ and $P_{32}$, which are all perceptrons of the second layer. Similarly, the output of $P_{21}$ of the first layer and output of $P_{31}$ of first layer are also connected to each of $P_{12}$, $P_{22}$ and $P_{32}$, which are all perceptrons of the second layer. However, in the drawings, illustrations are omitted for part of the connection relationship in consideration of the ease of viewing the drawings.

The weighting information for each perceptron (i.e. weighting value for each perceptron), and setting value information (i.e. setting value for each perceptron) being retained in the weighting storage unit 83 and setting value storage unit 84 is as mentioned above. In the following explanation and drawings, the weighting value is expressed by W accompanying a two-digit subscript. In addition, the setting value is expressed by S accompanying a two-digit subscript. In addition, the input of perceptrons in the beginning layer is expressed by X accompanying a two-digit subscript, and the output of the perceptrons is expressed by Y accompanying two-digit subscript.

Herein, these two-digit subscripts indicate the matter of being values corresponding to perceptrons accompanied by the same two-digit subscript. In other words, $W_{11}$ or $S_{11}$ represent being a weighting value or setting value corresponding to $P_{11}$. In addition, $X_{11}$ or $Y_{11}$ represent being the input or output corresponding to $P_{11}$. However, an explanation is made omitting these subscripts in the case of explaining without specifying which perceptron is corresponding.

In addition, although the weighting value of each perceptron is multiplied by the input of each perceptron, there are only as many inputs as the dimension number of the previous layer in each perceptron. For this reason, the weighting values of each perceptron are prepared only in the number of the dimension number for one perceptron. In the case of also describing the number of the dimension number corresponding for a weighting value, it defines the third digit W of the subscript. In the present example, since the dimension number as mentioned above becomes 3, for example, when taking $W_{11}$ or $W_{21}$ as an example, three subscripts as in the description of (Formula 1) below are attached to each weighting value.

$$W_{11} = (w_{11,1}, w_{11,2}, w_{11,3})$$

$$W_{21} = (w_{21,1}, w_{21,2}, w_{21,3}) \quad \text{[Formula 1]}$$

Figure 5:
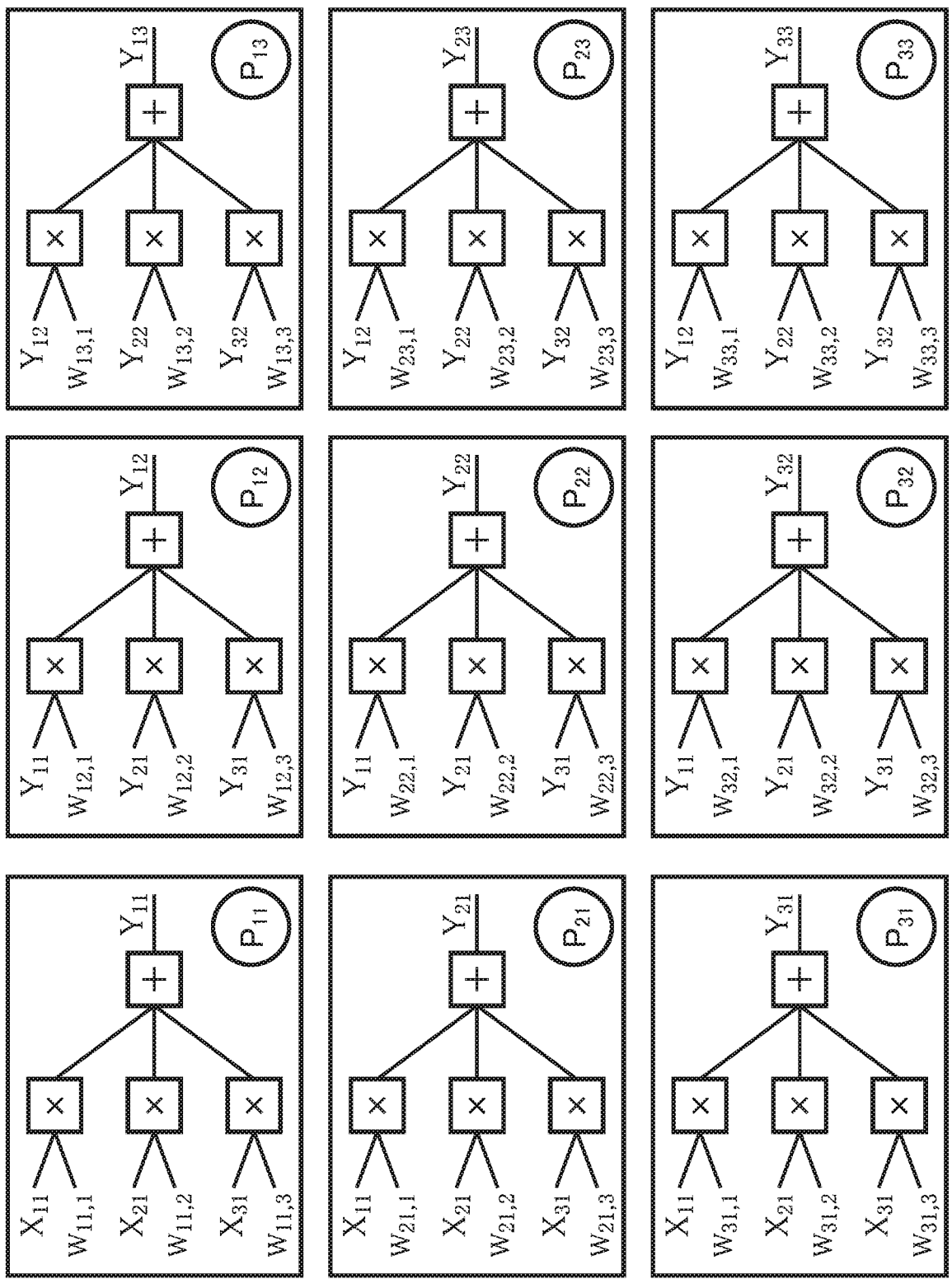
FIG. 5 is a diagram expressing a detailed connection relationship of each perceptron of an embodiment of the present invention.

Next, explanations are made for the configuration of each perceptron included in the perceptron circuit 85 and the input/output to each perceptron by referencing FIG. 5.

Each perceptron included in the perceptron circuit 85 has a plurality of multipliers of the same number as the dimension number, and one adder. The multiplier calculates and outputs a product from multiplying each input with the weighting value. The adder calculates and outputs the sum from adding all outputs of the plurality of multipliers. This configuration is a general function of the perceptron circuit 85. However, the perceptron circuit 85 of the learning circuit 80 of the present embodiment further includes a function of constructing any neural network model based on setting values.

Figure 6:
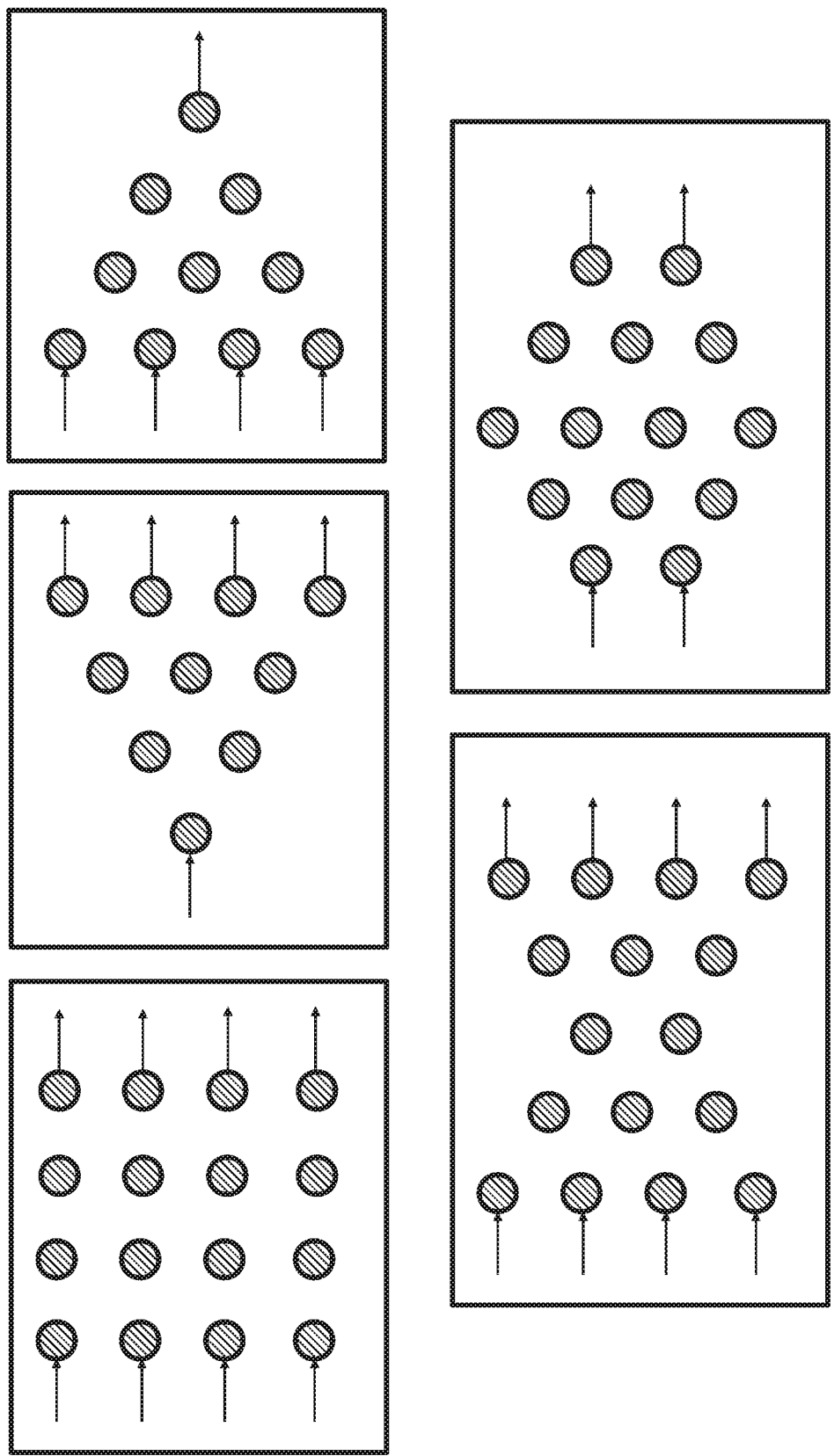
FIG. 6 is a diagram expressing a specific example of a neural network model of an embodiment of the present invention.

Herein, any neural network model is various neural network models such as those shown in FIG. 6, for example. In FIG. 6, an explanation is made for an example of constructing any neural network with the perceptron circuit 85 having a layer number of 5 and dimension number of 4. For example, as illustrated at the top left side of FIG. 6, it is possible to construct a neural network model setting one layer not to be used, and with four layers and four dimensions. In addition, alternatively, it is possible to construct a neural network model in which the dimension number increases accompanying an increase in layers, as illustrated at the top center of FIG. 6. Furthermore, alternatively, it is possible to construct a neural network model in which the dimension number decreases accompany an increase in layers, as illustrated at the top right side of FIG. 6. Moreover, alternatively, it is possible to construct a neural network model in which the dimension number decreases accompanying an increase in layers until the third layer, and the dimension number also increases accompanying an increase in layers from the fourth layer, as illustrated at the bottom left side of FIG. 6. In addition, alternatively, it is possible to construct a neural network model in which the dimension number also increases accompanying an increase in layers until the third layer, and the dimension number decreases accompanying an increase in layers from the fourth layer, as illustrated at the bottom right side of FIG. 6.

In order to construct any neural network in the perceptron circuit 85 as exemplified by these, the CPU 11 calculates the setting values $S_{ij}$ corresponding to any neural network model to be constructed in the present embodiment. Then, the multipliers included in each perceptron perform any output among the three outputs from the following (1) to (3) based on the setting values $S_{ij}$, corresponding to itself.

(1) Defines value from multiplying weight W by input X as output (hereinafter this output is called "$Y_W$")
(2) Defines output value as "0" (hereinafter this output is called "$Y_0$")
(3) Defines as is input X as output (hereinafter this output is called "$Y_{in}$")

Then, in the present embodiment, by selecting the output of each multiplier using the setting values $S_{ij}$, any neural network model is constructed on the perceptron circuit 85 of the learning circuit 80.

Figure 4:
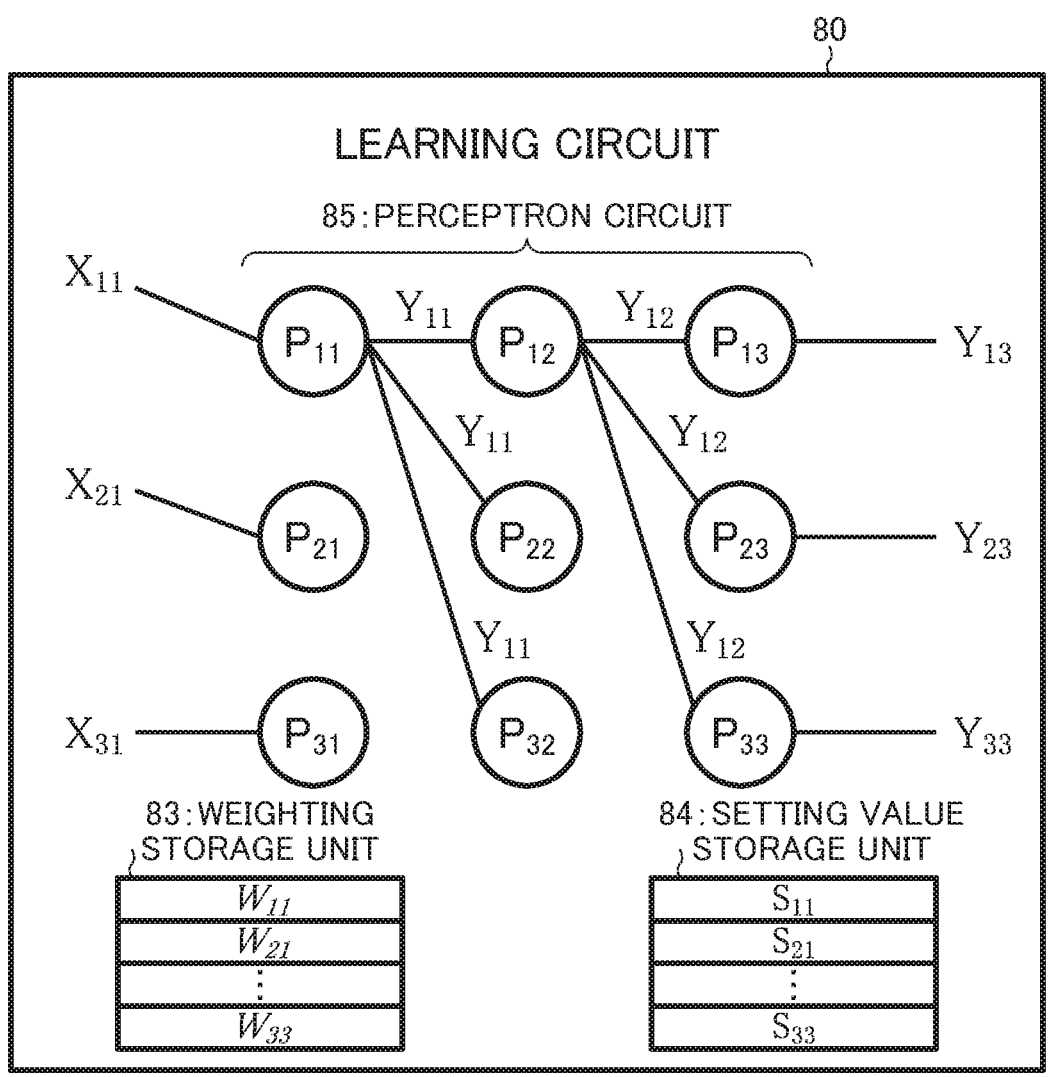
FIG. 4 is a diagram expressing an outline of the connection relationship of each perceptron of an embodiment of the present invention.

The method of constructing a neural network model by selecting outputs in this way will be explained using the specific example shown in FIG. 7. Herein, the learning circuit 80 having the perceptron circuit 85 of three layers and dimension number of 3 used in the explanations of FIGS. 3 and 4 is shown at the left side of FIG. 7. There is an objective of constructing the neural network model shown on the right side of FIG. 7 on this learning circuit 80. With such an objective neural network model, the second layer $P_{32}$ and entire third layer (i.e. $P_{13}$, $P_{23}$ and $P_{33}$) are unused perceptrons. In order to construct such a neural network model, the multipliers included in each perceptron select outputs as follows by dividing into a case of a part or entire layer being used (first layer, second layer of example) and a case of an entire layer not being used (third layer of example), based on the setting values $S_{ij}$.

<Case of Part or Entire Layer being Used>
Outputs of multipliers of used perceptron: all set to $Y_W$.
Outputs of multipliers of not used perceptron: all set to $Y_D$.
The sum calculated by the adder included in the perceptron thereby becomes a value from adding a value arrived at by multiplying the weighting value with the input outputted as usual of the used multiplier, and a value of zero outputted of multipliers not used. In other words, it is possible to calculate the sum of only values outputted from multipliers corresponding to the layer used.

<Case of Entire Layer not being Used>
Output of multiplier to which input from perceptron of same dimension as this perceptron enter: set as $Y_{in}$. Outputs other than the above: all set to $Y_0$. It thereby comes to output the input of the perceptron of the same dimension as is to the next layer. In other words, this layer is made substantially inactive.

Figure 7:
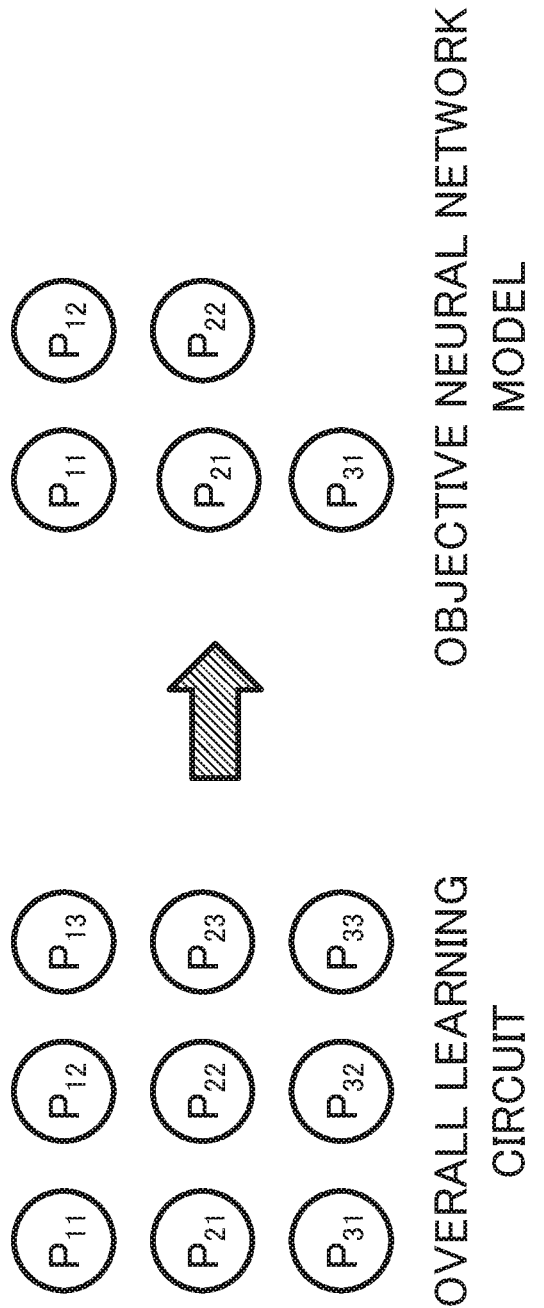
FIG. 7 is a diagram expressing a construction example of a target neural network model of an embodiment of the present invention.
Figure 8:
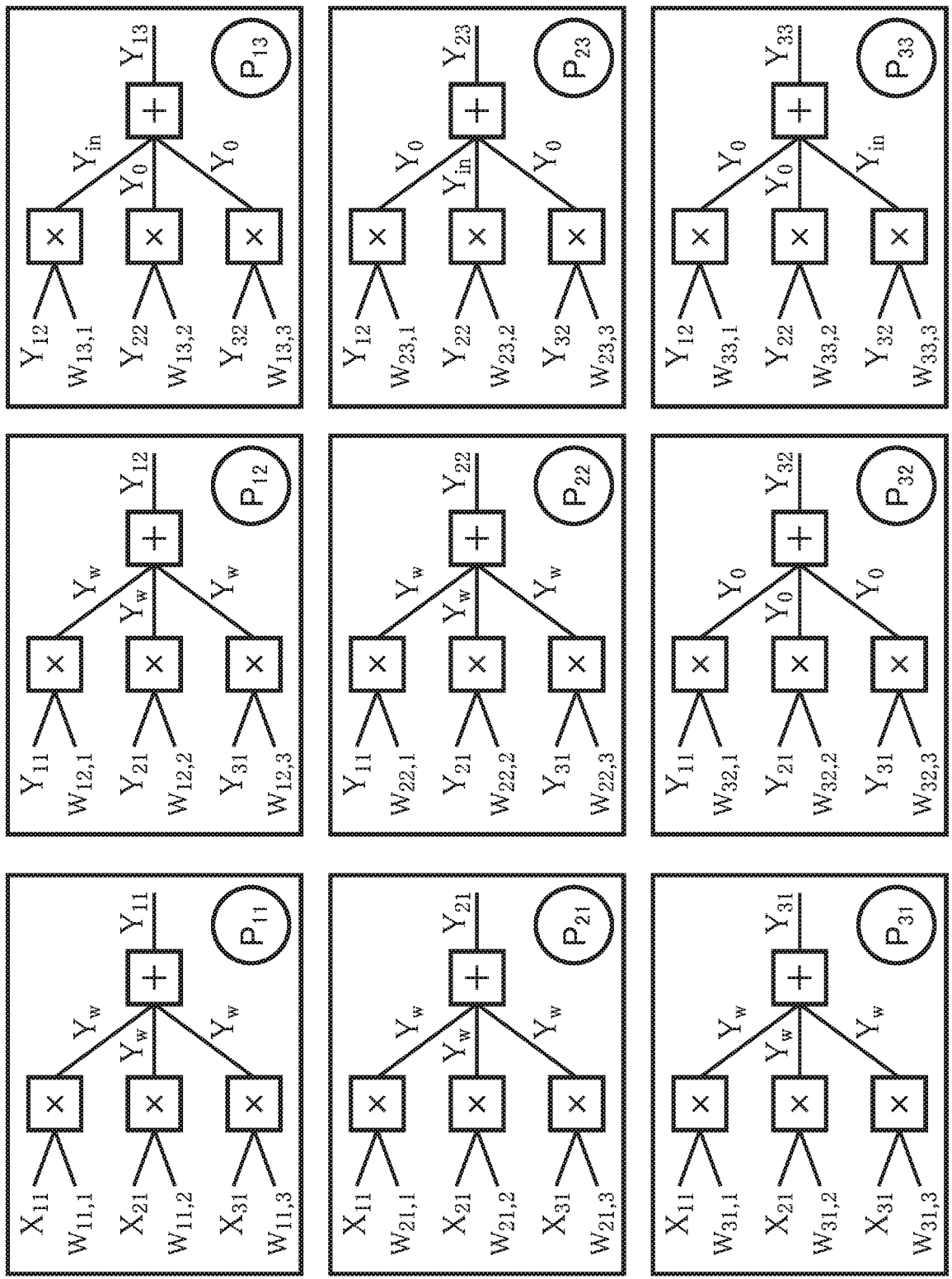
FIG. 8 is a diagram expressing input/output in a case of constructing a target neural network model of an embodiment of the present invention.

By way of the above output method, the input/output of each perceptron is shown in FIG. 8 for the case of constructing the neural network model shown on the right side in FIG. 7. The output of each perceptron comes to be as shown in (Formula 2) below. By each perceptron selecting the output in this way, the targeted neural network model shown on the right side of FIG. 7 can be constructed.

$$\text{First layer} \begin{cases} P_{11}:Y_{11} = w_{11.1} \cdot X_{11} + w_{11.2} \cdot X_{21} + w_{11.3} \cdot X_{31} \\ P_{21}:Y_{21} = w_{21.1} \cdot X_{11} + w_{21.2} \cdot X_{21} + w_{21.3} \cdot X_{31} \\ P_{31}:Y_{31} = w_{31.1} \cdot X_{11} + w_{31.2} \cdot X_{21} + w_{31.3} \cdot X_{31} \end{cases} \quad \text{[Formula 2]}$$

$$\text{Second layer} \begin{cases} P_{12}:Y_{11} = w_{12.1} \cdot Y_{11} + w_{12.2} \cdot Y_{21} + w_{12.3} \cdot Y_{31} \\ P_{22}:Y_{22} = w_{22.1} \cdot Y_{11} + w_{22.2} \cdot Y_{21} + w_{22.3} \cdot Y_{31} \\ P_{32}:Y_{22} = 0 \end{cases}$$

$$\text{Third layer} \begin{cases} P_{13}:Y_{13} = Y_{21} \\ P_{23}:Y_{23} = Y_{22} \\ P_{33}:Y_{33} = 0 \end{cases}$$

Despite being a method of realizing the function of the multipliers included in each perceptron selecting the output in this way, the present embodiment is realized by "establishing a circuit configuration changing the output from the setting value S". This point will be explained in detail below. It should be noted that ij is used as the subscript of the setting value S below. Herein, i of the setting value $S_{ij}$ is a variable corresponding to the dimension number of the perceptron serving as the setting target. In addition, j is a variable corresponding to the layer number of the perceptron serving as the setting target.

Herein, the setting value $S_{ij}$ is a value having the values of two flags as in (Formula 3) below.

$$S_{ij} \begin{cases} \text{flag1: } \begin{array}{l} \text{Value assumes "1" in case of entire } j^{th} \\ \text{layer not being used,} \\ \text{and assumes "0" in other cases} \end{array} \\ \text{flag2: } \begin{array}{l} \text{Value assumes "1" in case of} \\ \text{perception not being used,} \\ \text{and assumes "0" in case of perception} \\ \text{being used} \end{array} \end{cases} \quad \text{[Formula 3]}$$

In addition, each multiplier has a storage area that retains one value as the value of flag3 as in (Formula 4) below.

flag3: Among inputs from previous layer, value assumes "1" in case of input entering from same dimension, and assumes "0" in other cases     [Formula 4]

Herein, flag3 is a value fixed at the time of design of the learning circuit 80. When explaining this point by taking the example of $P_{12}$ in FIG. 8, since the input $Y_{11}$ from $P_{11}$, which is the same dimension perceptron, enters the topmost multiplier among three multipliers, the value of flag3 of this multiplier is "1". On the other hand, for the multiplier in the middle among three multipliers, since the input $Y_{21}$ from $P_{21}$ of the perceptron which is not the same dimension enters, the value of flag3 of this multiplier is "0". Similarly, for the bottommost multiplier among three multipliers, since the input $Y_{31}$ from $P_{31}$ of the perceptron not of the same dimension enters, the value of flag3 of this multiplier is "0".

Next, a series of processing of the present embodiment will be explained for a case of using the setting values $S_{ij}$ as mentioned above. Hereinafter, an explanation is made first for the setting of parameter values corresponding to the neural network model to be constructed. Then, an explanation is made for a method in which the CPU 11 calculates the values of flag1 and flag2 based on the parameter values set next. The calculated values of flag1 and flag2 are set in the multipliers of each perceptron as the setting values $S_{ij}$.

Finally, an explanation is made for the circuit configuration for changing the output of the multiplier based on the values of flag1 and flag2 set in this way, and the value of flag3 retained by the multipliers of each perceptron.

First, an explanation is made for the setting of parameter values corresponding to the neural network model to be constructed. The present embodiment prepares the following three modes as modes for constructing neural networks by setting parameter values.

Mode 1: mode constructing a neural network model by setting parameter values according to the selection of the user on a graphical interface (hereinafter called "GUI" as appropriate)

Mode 2: mode constructing neural network model by reading parameter values from external setting information Mode 3: mode constructing a neural network model by setting parameter values by the user performing graphical editing work on the GUI Hereinafter, specific setting screens corresponding to each of these modes will be explained by referencing the drawings. These setting screens are displayed on the display/MDE unit 70 by the CPU 11. In addition, the setting of parameter values using these setting screens is executed by the user performing a manipulation using the display/MDE unit 70 or control panel 71. It should be noted that the parameter values of the present embodiment at least designate the layer number and dimension number of each layer in the neural network to be constructed.

Figure 9:
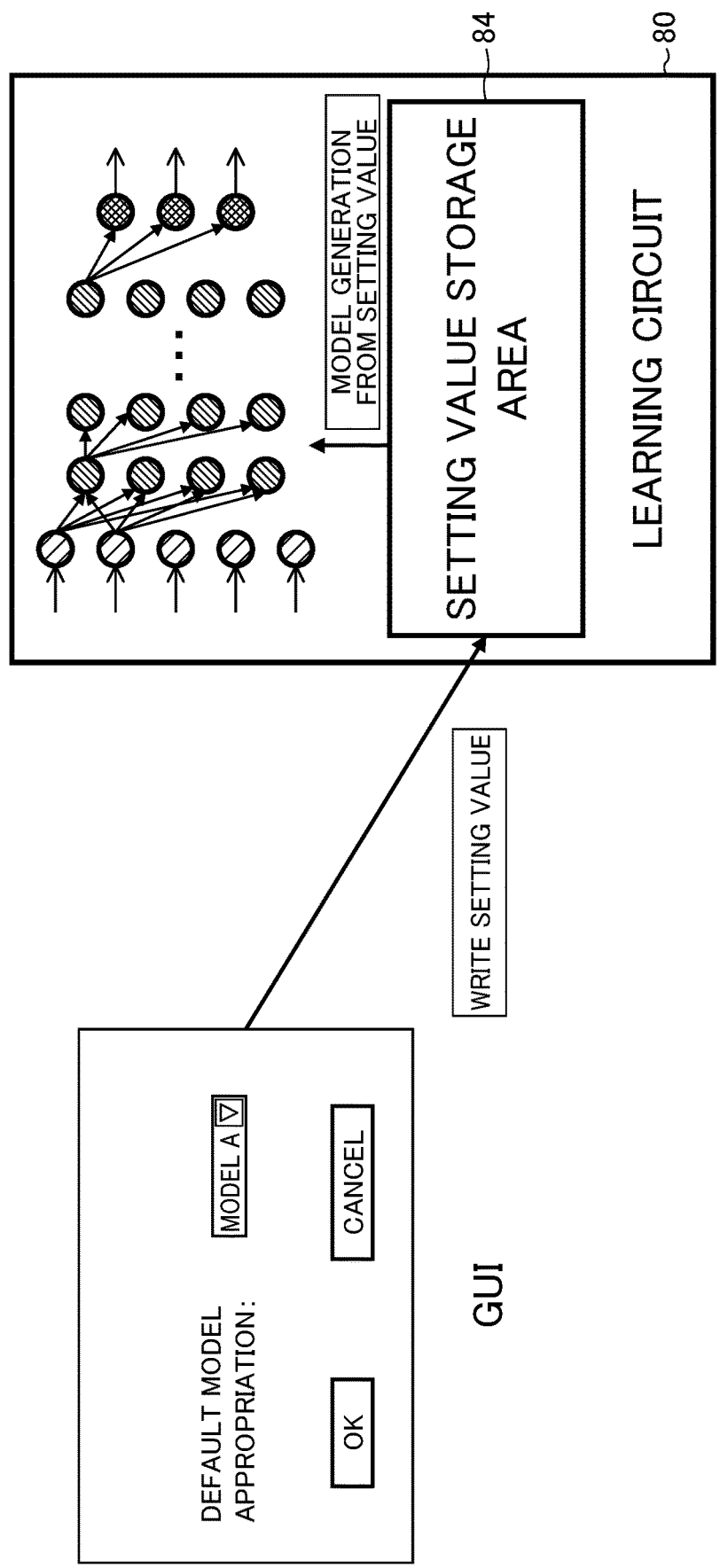
FIG. 9 is a diagram expressing a first setting screen of parameter values of an embodiment of the present invention.

First, the example of a first setting screen for parameter values is shown in FIG. 9. The present example is an example allowing the user to select a representative neural network model from a list, which is an example corresponding the aforementioned mode 1.

In the present example, as representative neural network models that can be selected, at least one neural network model such as that shown in FIG. 6 is prepared as a default neural network model. Then, the prepared neural network mode is selected by the user as "model A", for example. The CPU 11 has parameter values set therein for constructing this selected neural network model. Then, although similar for the examples of setting screens hereinafter, the values of flag1 and flag2 are calculated based on the parameter values set, and the calculated values of flag1 and flag2 are stored in the setting value storage unit 83 as setting values $S_{ij}$.

Figure 10:
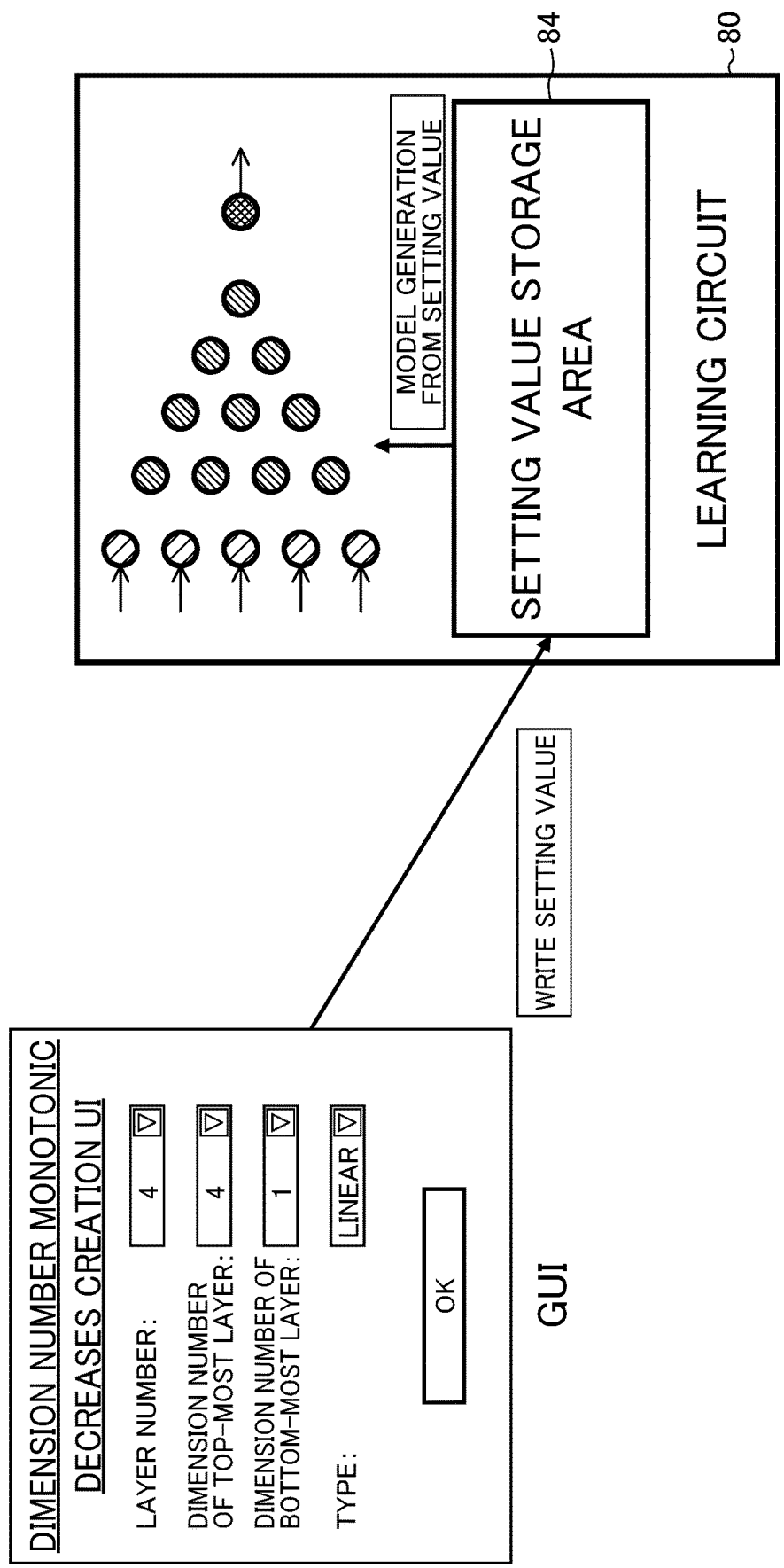
FIG. 10 is a diagram expressing a second setting screen of parameter values of an embodiment of the present invention.

Next, an example of a second setting screen of parameter values is shown in FIG. 10. The present example is an example constructing a neural network model based on the number of layers, dimension number of the top-most layer, dimension number of the bottom-most layer and type designated from the user, which is an example corresponding to the aforementioned mode 1. What is shown in FIG. 10 is a dimension number monotonic decreasing creation UI, and is a user interface for constructing a neural network model in which the dimension number monotonically decreases as the layers increase. This is a user interface for constructing a neural network model such as that shown on the top-most right side of FIG. 6, and otherwise, may be configured to provide a user interface for constructing other neural network models shown in FIG. 6.

In the present embodiment, the beginning layer is defined as the top-most layer and the last layer is defined as the bottom-most layer of the neural network mode with the number layers designated from the user. Then, since linear is designated as the type, it is configured so that the parameter values are set for constructing a neural network model such that the dimension number decreases one-by-one as the layers increase from the dimension number of the top-most layer designated, and to be the dimension number of the bottom-most layer designated at the bottom-most layer. In this case, for example, if a quadratic function is selected as the type, the number of the dimension number decreasing as the layers increases will be made to change. For example, it is configured so that the parameter values are set for constructing a neural network model such that the dimension number decreases by one when the layers increase by three layers from the beginning layer, then the dimension number decreases by one when the layers increase by two layers, and thereafter, the dimension number decreases by one when the layers increase by one layer.

Figure 11:
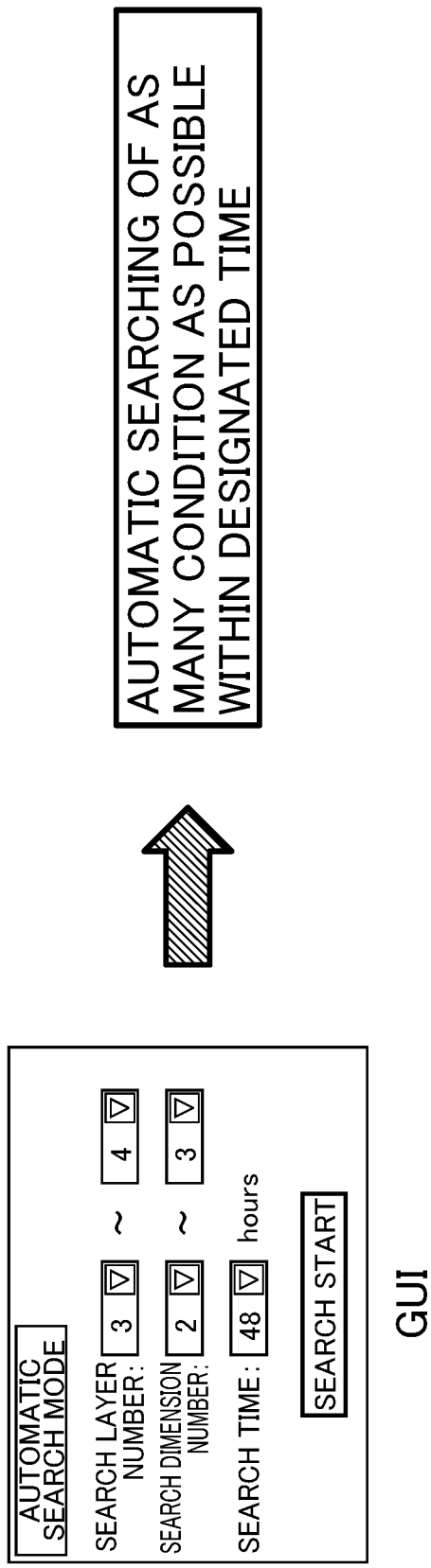
FIG. 11 is a diagram expressing a third setting screen of parameter values of an embodiment of the present invention.

Next, an example of a third setting screen of parameter values is shown in FIG. 11. The present example is an example of performing a search of a plurality of neural network models automatically based on conditions such as search range and search time designated from the user, which is an example corresponding to the aforementioned mode 1.

In the present example, it is configured so that the user can designate the range of layer numbers, range of dimension numbers, and search time. Then, the CPU 11 constructs a neural network model while causing layer number and dimension number to differ within the range of layer numbers, and the range of dimension numbers designed. Then, machine learning is performed by the constructed neural network model until the designated search time elapses. For example, if the range of layer numbers designated is 3 to 4, and the range of dimension numbers designated is 2 to 3, a neural network model will be constructed in which the dimension number of the first layer is 2, the dimension number of the second layer is 2, and the dimension number of the third layer is 2. Then, machine learning is performed for a predetermined time with this constructed neural network model. Next, a neural network model is constructed in which the dimension number of the first layer is 3, the dimension number of the second layer is 2, and the dimension number of the third layer is 2. Then, machine learning is performed for a predetermined time with this constructed neural network model. Next, a neural network model is constructed in which the dimension number of the first layer is 3, the dimension number of the second layer is 3, and the dimension number of the third layer is 2. Then, machine learning is performed for a predetermined time with this constructed neural network model. By configuring in this way, a neural network model is constructed while changing the layer number and dimension number within the range of layer numbers and range of dimension numbers designated.

It should be noted that length of predetermined time indicates the length of time calculated by dividing the designated time by the number of neural network models that can be constructed within the range of layer numbers and range of dimension numbers designated. Then, the user can determine a neural network model believed to be appropriate by referencing the results of machine learning of all constructed neural network models.

Figure 12:
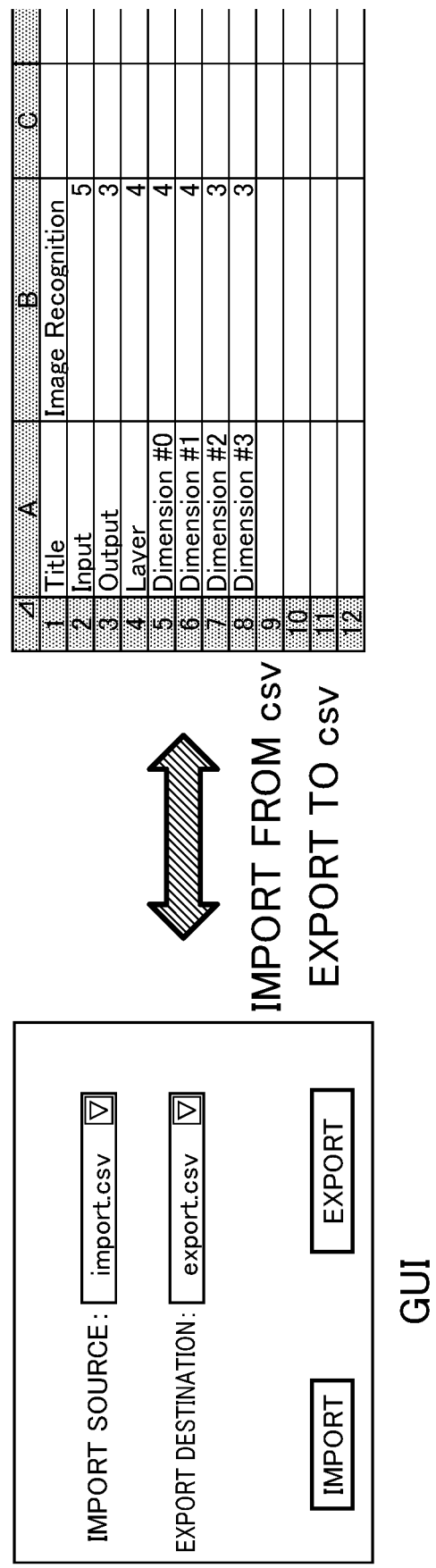
FIG. 12 is a diagram expressing a fourth setting screen of parameter values of an embodiment of the present invention.

Next, an example of a fourth setting screen of parameter values is shown in FIG. 12. The present example is an example of reading parameter values from external setting information existing in an import source selected by the user, which is an example corresponding to the aforementioned mode 2.

In the present example, the parameter values such as layer number and dimension number are imported in a file format such as CSV. Then, the imported parameter values are set as parameter values of the neural network model to be constructed. The import source is configured to enable selection by the user. It thereby becomes possible to construct a neural network model similar to the neural network model constructed by the other numerical control 100, for example. It should be noted that it is also made possible to export parameter values currently set in a file format such as CSV.

Figure 13:
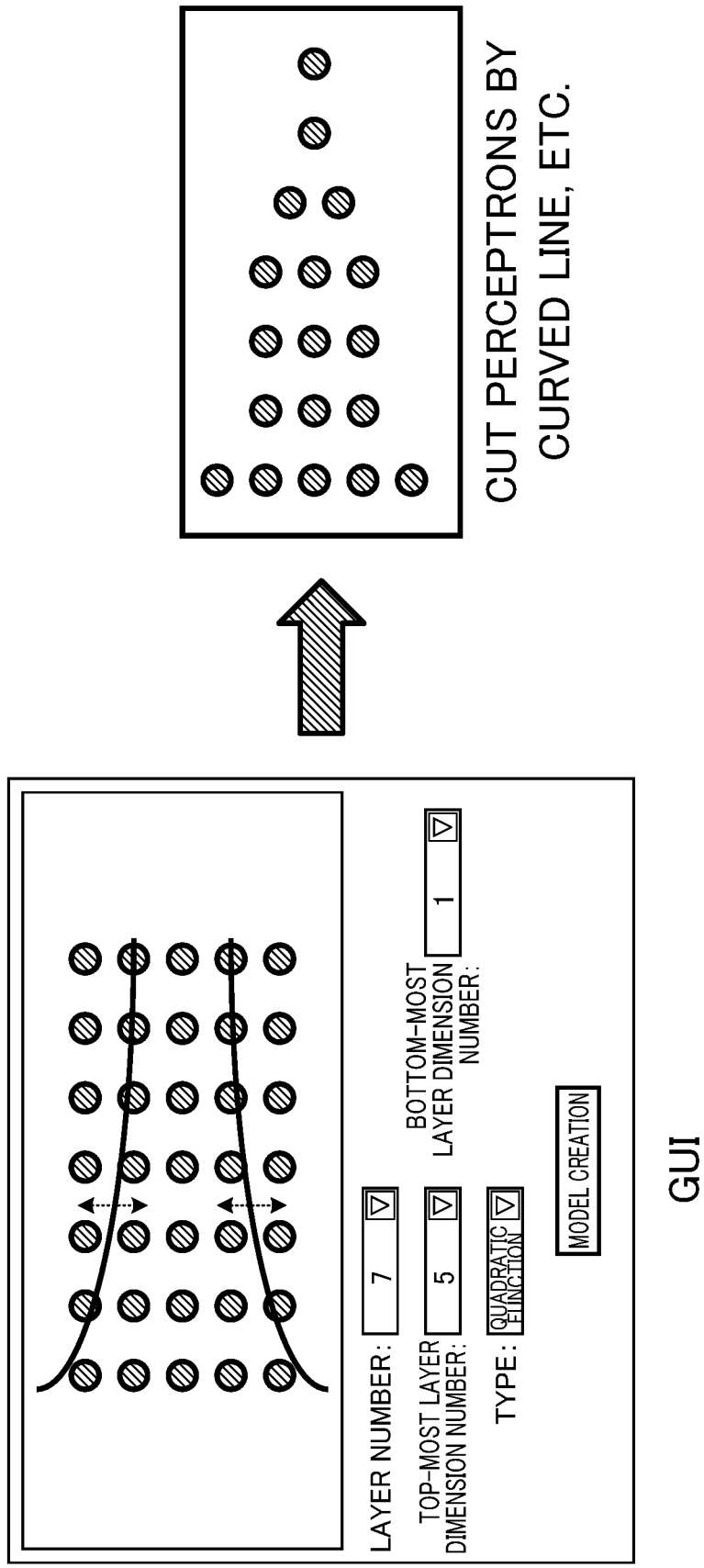
FIG. 13 is a diagram expressing a fifth setting screen of parameter values of an embodiment of the present invention.

Next, an example of a fifth setting screen of parameter values is shown in FIG. 13. The present example is an example realizing the designation of each parameter value on the aforementioned second setting screen of parameter values by the user performing graphical editing work
The present example is an example corresponding to the aforementioned mode 3.

In the present example, the connection relationship of the neural network is displayed graphically on the screen. Then, it is assumed that, by the user performing editing on this graphical display, the neural network model to be constructed is designated, and the parameter values for constructing this designated neural network model are set. For example, an explanation is made for the case of setting the type as quadratic function on the aforementioned second setting screen of parameter values. In this regard, there is also a case of it not being easy for the user to imagine the form of the neural network model constructed in the case of setting the type as quadratic function. However, with the present example, since the form of the neural network model to be constructed is displayed graphically, it is possible to easily set the parameter values upon imagining the form of the neural network model to be actually constructed. It should be noted that such graphical editing has not been described or suggested in the aforementioned respective patent documents.

Figure 14:
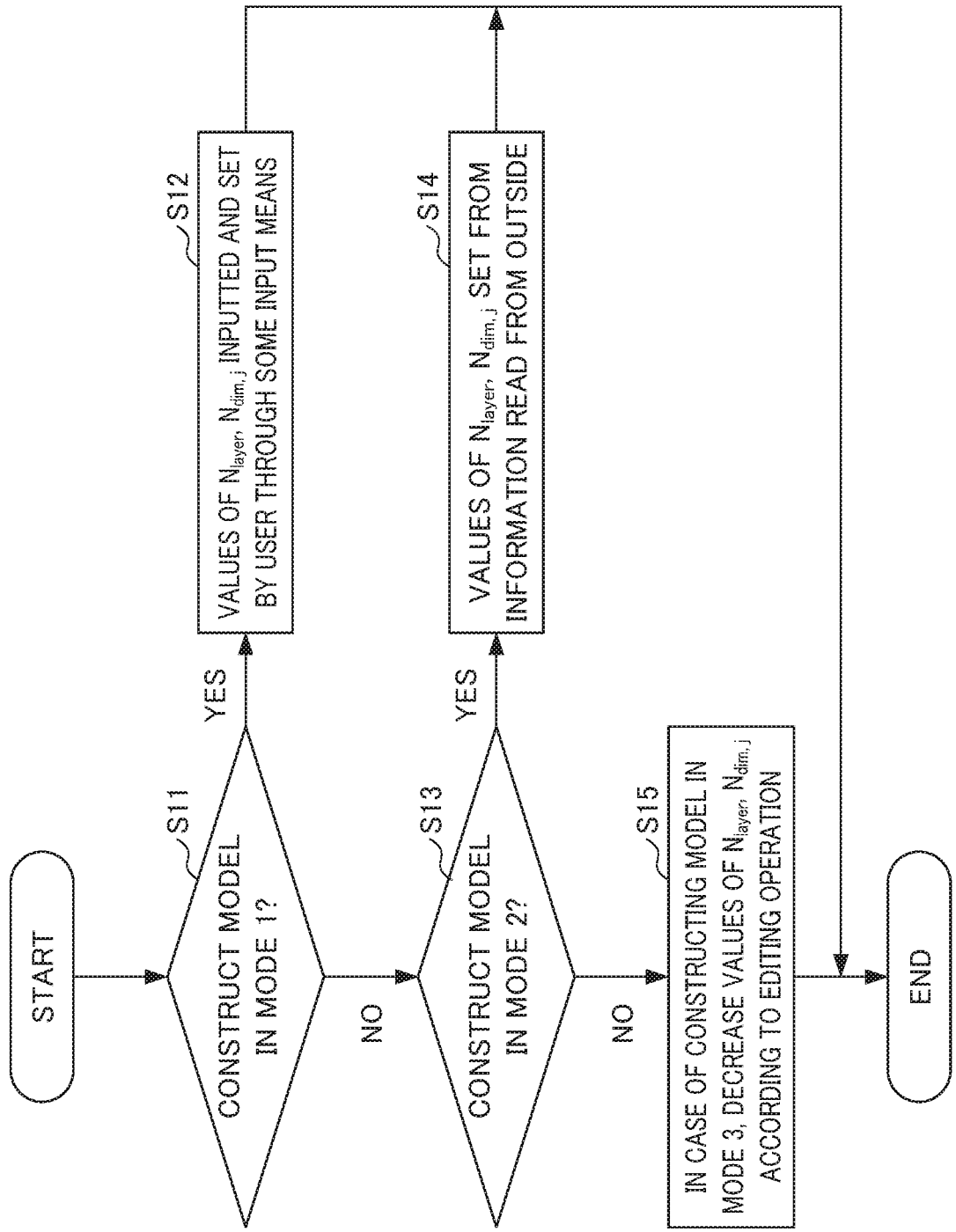
FIG. 14 is a flowchart expressing operations during setting of parameter values of an embodiment of the present invention.

Next, an explanation is made for the operation of the CPU 11 in the case of setting the parameter values by way of any of these setting screens, by referencing the flowchart of FIG. 14. As a premise of the explanation herein, the parameter values include $N_{layer}$ and $N_{dim,j}$ hereinafter as values thereof.

$N_{layer}$: layer number of neural network model to be constructed $N_{dim,j}$: dimension number of each layer of the neural network model to be constructed (herein, j is an integer expressing the layer number)

As shown in FIG. 14, first, it is determined whether or not to set the parameter values for constructing the neural network model according to mode 1 (Step S11).

If setting the parameter values with mode 1 (YES in Step S11), the processing advances to Step S12. Then, by using any of the setting screens corresponding to mode 1, for example, the aforementioned first setting screen of parameter values, second setting screen of parameter values, and third setting screen of parameter values, the user sets the parameter values $N_{layer}$ and $N_{dim,j}$ (Step S12). The present setting processing of parameter values thereby ends.

On the other hand, if not setting parameter values with mode 1, (NO in Step S11), the processing advances to Step S13. Then, it is determined whether or not to set the parameter values for constructing the neural network model by way of mode 2 (Step S13).

If setting the parameter values with mode 2 (YES in Step S13), the processing advances to Step S14. Then, by using a setting screen corresponding to mode 2, for example, the aforementioned fourth setting screen of parameter values, the user acquires the parameters values to set $N_{layer}$ and $N_{dim,j}$ from the selected import source (Step S14).
The present setting processing of parameter values thereby ends.

On the other hand, if not setting the parameter values with mode 2 (NO in Step S13), the processing advances to Step S15. Then, the parameter values for constructing the neural network model are set by way of mode 3. More specifically, by using a setting screen corresponding to mode 3, for example, the aforementioned fifth setting screen of parameter values, the user sets the parameter values $N_{layer}$ and $N_{dim,j}$ according to a graphical editing method. The present setting processing of parameter values thereby ends.

Figure 15:
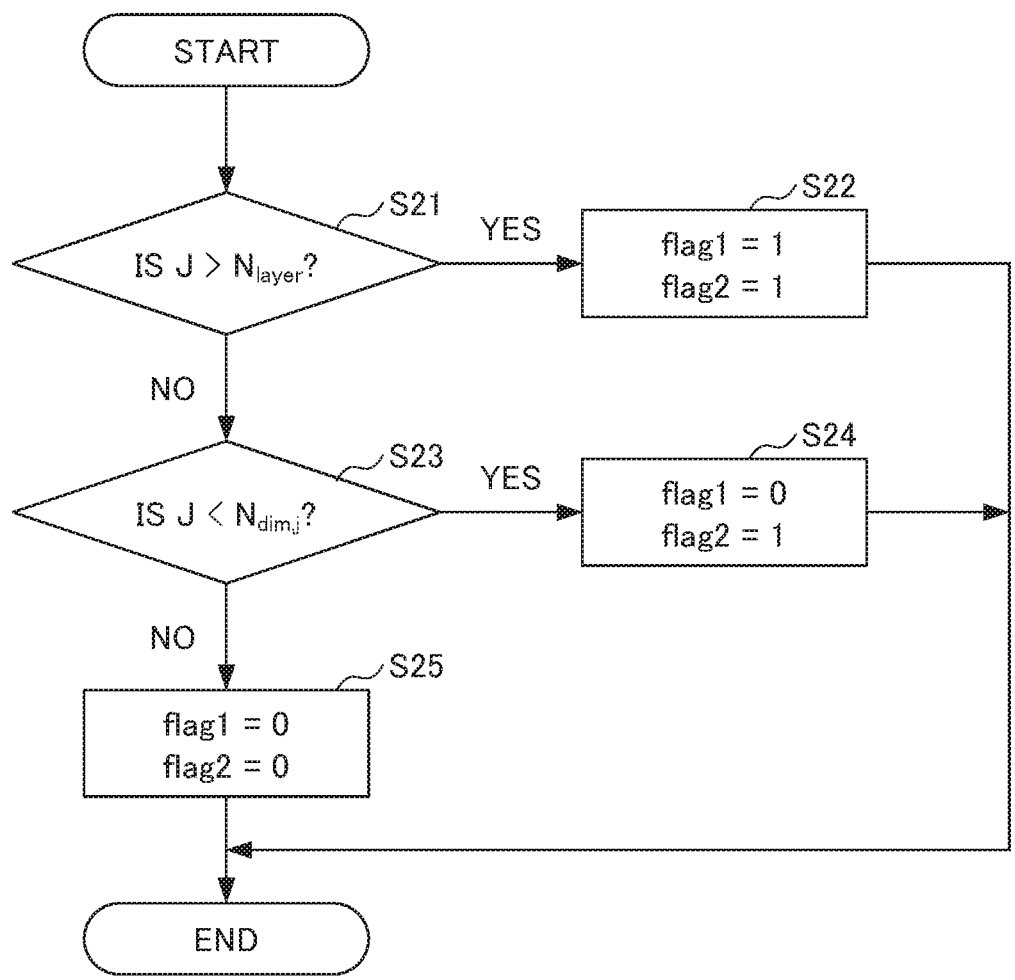
FIG. 15 is a flowchart expressing operations during creation of setting values of an embodiment of the present invention.

Next, the processing of generating setting values $S_{ij}$ by the CPU 11 calculating values of flag 1 and flag 2 based on the parameter values set in this way will be explained by referencing the flowchart of FIG. 15. It should be noted that the present processing is repeated until the setting values $S_{ij}$ corresponding to all of the perceptrons of the respective layers and dimensions have been generated.

First, it is determined if the relationship between the value of j of the setting value $S_{ij}$ to be generated presently and "j>$N_{layer}$" for the value of the $N_{layer}$ is viable (Step S21). If this relationship is viable (YES in Step S21), the processing advances to Step S22. Then, by setting the values of each of flag1 and flag2 of the setting value $S_{ij}$ to be generated presently to "1", the setting value $S_{ij}$, is generated (Step S22). The generated setting value $S_{ij}$ is stored in the setting value storage unit 84. The generation processing of the setting value $S_{ij}$ to be generated presently thereby ends.

On the other hand, if the relationship between the j value of the setting value $S_{ij}$ to be generated presently and "j>$N_{layer}$" for the value of $N_{layer}$ is not viable (NO is Step S21), the processing advances to Step S23. Then, $N_{dim,j}$ sharing the j value with the setting value $S_{ij}$ to be generated presently is selected. In addition, it is determined if the relationship between this selected value of $N_{dim,j}$ and "i>$N_{dim,j}$" for the i value of the setting value $S_{ij}$ to be generated presently is viable (Step S23). If this relationship is viable (YES in Step 23), the processing advances to Step S24. Then, by setting the value of the flag1 of the setting value $S_{ij}$ to be generated presently to "0", and setting the value of flag2 to "1", the setting value $S_{ij}$ is generated (Step S24). The generated setting value $S_{ij}$ is stored in the setting value storage unit 84. The generation processing of the setting value $S_{ij}$ to be generated presently thereby ends.

In addition, if the relationship between the i value of the setting value $S_{ij}$ to be generated presently and "i>$N_{dim,j}$" for the selected value of $N_{dim,j}$ is not viable (NO in Step S23), the processing advances to Step S25. Then, by setting the respective values of flag1 and flag2 of the setting value $S_{ij}$ to be generated presently to "0", the setting value $S_{ij}$ is generated (Step S25). The generated setting value $S_{ij}$ is stored in the setting value storage unit 84. The generation processing of the setting value $S_{ij}$ to be generated presently thereby ends.

The processing explained above by referencing FIG. 15 is repeated until setting values $S_{ij}$ corresponding to the respective perceptrons of each layer and dimension are generated. The setting values $S_{ij}$ corresponding to the respective perceptrons of each layer and dimension thereby come to be saved in the setting value storage unit 84.

Next, the relationships between the values of flag1 and flag2 of the setting value $S_{ij}$ stored in this way, value of flag3 retained by the multiplier of each perceptron included in the perceptron circuit 85, and output of the multiplier are shown in (Table 1) below.

TABLE 1

| Output of multiplier | flag1 | flag2 | flag3 | Explanation |
|---|---|---|---|---|
| $Y_{in}$ | 1 | x | 1 | Multiplier to which input of same dimension enters without using entire layer |
| $Y_0$ | 1 | x | 0 | Multiplier other than the above, without using entire layer |
| $Y_w$ | 0 | 0 | x | Multiplier of perceptron being used |
| $Y_0$ | 0 | 1 | x | In case of using part of layer, multiplier of perceptron not being using in this layer |

Figure 16:
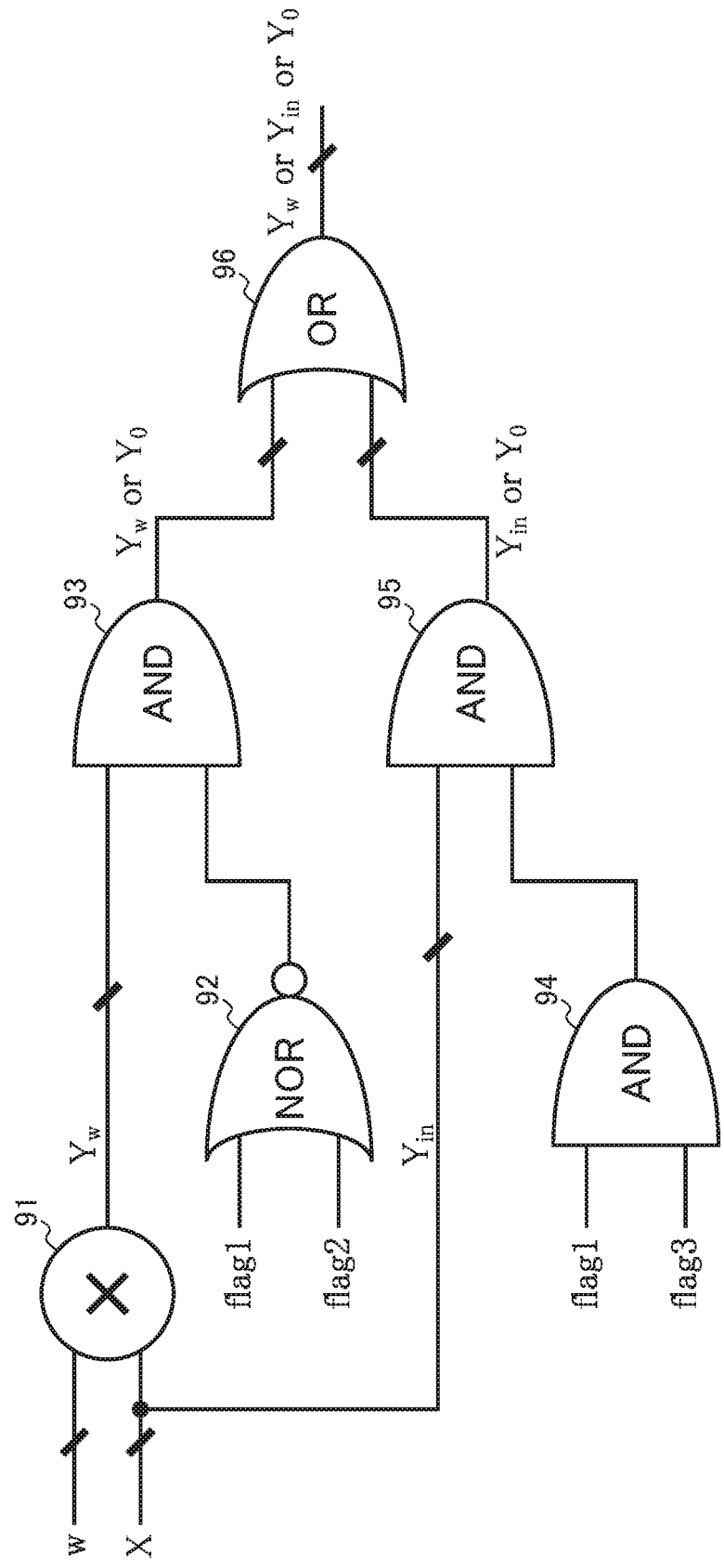
FIG. 16 is a diagram expressing a multiplier and the circuit configuration of a circuit attached with this of an embodiment of the present invention.

Then, an explanation is made for the multiplier performing output as in (Table 1) according to the value of each flag, by referencing the circuit configuration of multipliers of each perceptron shown in FIG. 16. It should be noted that the circuit configuration shown in FIG. 16 is merely one of the circuit configuration examples, and it may be configured so as to realize the same operations by way of another circuit configuration.

As shown in FIG. 16, the multipliers of each perceptron include not only the multiplier 91, but also the NOR circuit 92, AND circuit 93, AND circuit 94, AND circuit 95 and OR circuit 96 as accompanying circuits. It should be noted that, since the circuit configuration of multipliers of each perceptron is shared, an explanation is made without attaching subscripts indicating the layer number and dimension number in FIG. 16.

The input X and weighting value w are inputted to the multiplier 91. By multiplying the input X and weighting value w, the multiplier 91 inputs $Y_w$, which is the product of these, to the input terminal of the AND circuit 93. On the other hand, the input X is branched off and inputted as $Y_{in}$ to the input terminal of the AND circuit 95. In addition, the values of flag1 and flag 2 are inputted to the input terminal of the NOR circuit 92. Furthermore, the values of flag1 and flag3 are inputted to the input terminal of the AND circuit 94. Up to here are shared operations without regard for the value of each flag.

Next, an explanation is made for the case of the values of flag1 and flag3 both being "1". This corresponds to the top-most case in the aforementioned (Table 1). It should be noted that, in this case, the output is determined without regard if the value of flag2 is "1" or is "0".

In this case, since the value of flag1 inputted to the NOR circuit 92 is "1", the output of the NOR circuit 92 will be "0" even if the value of flag2 is "1" or "0". When this is done, since "0" and $Y_w$ are inputted to the input terminal of the AND circuit 93, the output of the AND circuit 93 will be $Y_0$, and $Y_0$ will be inputted to the input terminal of the OR circuit 96. In addition, since the value of flag1 inputted to the AND circuit 94 is "1", and the value of flag3 is also "1", the output of the AND circuit 94 will be "1". When this is done, since "1" and $Y_{in}$ are inputted to the input terminal of the AND circuit 95, the output of the AND circuit 93 will be $Y_{in}$ and $Y_{in}$ will be inputted to the input terminal of the OR circuit 96. Since $Y_0$ and $Y_{in}$ are inputted to the input terminal of the OR circuit 96 according to the above, the output of the OR circuit 96 will be $Y_{in}$. Such an output is inputted to the adder in each perceptron. By configuring in this way, it will be outputted as shown at the top-most of the aforementioned (Table 1). It should be noted that this case is a case of being a multiplier to which the input of the same dimension enters without using the entire layer.

Next, an explanation is made for a case of the value of flag 1 being "1" and the value of flag3 being "0". This corresponds to the second case from the top of the aforementioned (Table 1). It should be noted that, in this case, the output is decided without regard for the value of flag2 being "1" or being "0".

In this case, since the value of flag1 inputted to the NOR circuit 92 is "1", the output of the NOR circuit 92 will be "0" even if the value of flag2 is "1" or "0". When this is done, since "0" and $Y_w$ are inputted to the input terminal of the AND circuit 93, the output of the AND circuit 93 will be $Y_0$, and $Y_0$ will be inputted to the input terminal of the OR circuit 96. In addition, since the value of flag1 inputted to the AND circuit 94 is "1", and the value of flag3 is "0", the output of the AND circuit 94 will be "0". When this is done, since "0" and $Y_{in}$ are inputted to the input terminal of the AND circuit 95, the output of the AND circuit 93 will be $Y_0$, and $Y_0$ will be inputted to the input terminal of the OR circuit 96. Since $Y_0$ and $Y_0$ are inputted to the input terminal of the OR circuit 96 according to the above, the output of the OR circuit 96 will be $Y_0$. This output is inputted to the adder inside each perceptron. By configuring in this way, it is outputted as shown in the second line from the top of the aforementioned (Table 1). It should be noted that this case is a case of becoming a multiplier other than a multiplier to which the input of the same dimension enters, without using the entire layer.

Next, an explanation is made for a case of the value of flag1 being "0" and the value of flag2 being "0". This corresponds to the third case from the top of the aforementioned (Table 1). It should be noted that, in this case, the output is decided without regard for the value of flag3 being "1" or "0".

In this case, the value of flag1 inputted to the NOR circuit 92 is "0", and the value of flag2 inputted to the NOR circuit 92 is also "0". For this reason, the output of the NOR circuit 92 is "1". When this is done, "1" and $Y_w$ are inputted to the input terminal of the AND circuit 93, the output of the AND circuit 93 will be $Y_w$, and $Y_w$ will be inputted to the input terminal of the OR circuit 96. In addition, the value of flag1 inputted to the AND circuit 94 is "0", and the output of the AND circuit 94 will be "0" even if the value of flag3 is "1" or "0". When this is done, since "0" and $Y_{in}$ will be inputted to the input terminal of the AND circuit 95, the output of the AND circuit 93 will be $Y_0$, and $Y_0$ will be inputted to the input terminal of the OR circuit 96. Since $Y_W$ and $Y_0$ are inputted to the input terminal of the OR circuit 96 according to the above, the output of the OR circuit 96 will be $Y_w$. This output is inputted to the adder inside each perceptron. By configuring in this way, it is outputted as shown in the third line from the top of the aforementioned (Table 1). It should be noted that this case is a case of becoming a multiplier of a perceptron being used.

Next, an explanation is made for a case of the value of flag1 being "0" and the value of flag2 being "1". This corresponds to the bottom-most case from the top of the aforementioned (Table 1). It should be noted that, in this case, the output is decided without regard for the value of flag3 being "1" or "0". In this case, the value of flag1 inputted to the NOR circuit 92 is "0", and the value of flag2 inputted to the NOR circuit 92 is "1". For this reason, the output of the NOR circuit 92 is "0". When this is done, since "0" and $Y_w$ are inputted to the input terminal of the AND circuit 93, the output of the AND circuit 93 will be $Y_0$, and $Y_0$ will be inputted to the input terminal of the OR circuit 96. In addition, the value of flag1 inputted to the AND circuit 94 is "0", and the output of the AND circuit 94 will be "0" even if the value of flag3 is "1" or "0". When this is done, since "0" and $Y_{in}$ are inputted to the input terminal of the AND circuit 95, the output of the AND circuit 93 will be $Y_0$, and $Y_0$ will be inputted to the input terminal of the OR circuit 96. Since $Y_0$ and $Y_0$ are inputted to the input terminal of the OR circuit 96 will be $Y_0$. This output is inputted to the adder inside each perceptron. By configuring in this way, it is outputted as shown at the bottom-most from the top of the aforementioned (Table 1). It should be noted that, if using part of a layer, this case is a case of becoming the multiplier of a perceptron not being used in this layer.

As explained above, as a learning circuit, the present embodiment prepares a learning circuit 80 that includes a sufficient number of perceptrons for constructing any neural network model, and enables changing the number of perceptrons used according to the neural network model actually constructed. In addition, by the CPU 11 operating as shown in the flowchart of FIG. 14, parameter values corresponding to the neural network model to be constructed are received from the user. Furthermore, by the CPU 11 operating as shown in the flowchart of FIG. 15, the setting value $S_{ij}$ including the values of flags corresponding to the parameter values is generated. Furthermore, the multiplier of each perceptron of a circuit configuration such as that shown in FIG. 16 makes an output according to the setting value $S_{ij}$. Furthermore, the adder of each perceptron outputs the sum of outputs of the multipliers of each perceptron.

By operating in this way, the present embodiment realizes outputs such as those shown in FIG. 8, and can construct a desired neural network model on the learning circuit 80 as shown in FIG. 7. In other words, the present embodiment exerts an effect of enabling to flexibly construct learning circuits corresponding to various neural network models.

It should be noted that the aforementioned embodiment is a suitable embodiment of the present invention; however, it is not to limit the scope of the present invention to only the above-mentioned embodiment, and implementation is possible in forms arrived at by conducting various modifications within a scope not deviating from the spirit of the present invention.

For example, it may be made as a configuration such that the learning circuit 80 exists outside of the numerical control 100, and this learning circuit 80 and numerical control 100 are connected by some kind of interface. In addition, the program for causing to function as a numerical control, and the program for performing construction of the neural network model, may be stored in different storage devices, and different CPUs may process each of the programs. Furthermore, it may be configured so as to realize the functions for performing construction of the neural network model not by the numerical control 100, but rather by a server, etc., and construct a neural network model in order to solve problems unrelated to the numerical control 100. In other words, it may be configured so as not to limit the application scope of the present embodiment to the numerical controls 100.

In addition, the function of the multiplier included in each perceptron selecting an output is realized by "establishing a circuit configuration changing the output from the setting value S" in the above explanation. Without configuring in this way, for example, but rather by way of "changing the output by adjusting the weighting value", it may be configured so as to realize the function of the multiplier included in each perceptron selecting an output. In this case, the weighting value inputting to the multiplier outputting $Y_W$ may be set as "W", the weighting value inputting to the multiplier outputting $Y_{in}$ may be set as "1", and the weighting value inputting to the multiplier outputting $Y_0$ may be set as "0".

It should be noted that the above-mentioned numerical control can be realized by hardware, software or a combination thereof. In addition, the construction method of a neural network model performed by the above-mentioned numerical control can be realized by hardware, software or a combination thereof. Herein, realized by software indicates the matter of being realized by a computer reading and executing programs.

The program can be stored using various types of non-transitory computer readable medium and supplied to computer. Non-transitory computer readable medium includes various types of tangible storage media. Examples of non-transitory computer readable media include magnetic media (for example, flexible disk, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the program may be provided to a computer by way of various types of transitory computer readable media. Examples of non-transitory computer readable media include electrical signals, optical signals and electromagnetic waves. The non-transitory computer readable medium can supply programs to a computer via wired communication pathways such as electric lines and optical fiber, or wireless communication pathways.

INDUSTRIAL APPLICABILITY

The present invention is widely suitable to applications that perform construction of models for machine learning, and is particularly suitable to applications that perform construction of neural network models.

EXPLANATION OF REFERENCE NUMERALS

11 CPU
12 ROM
13 RAM
14 CMOS memory
15, 18, 19 interface
16 PMC
17 I/O unit
20 data communication bus
30 to 34 axis control circuit
40 to 44 servo amplifier
50 to 54 servomotor
60 spindle control circuit
61 spindle amplifier
62 spindle motor
63 pulse encoder
70 display/MDI unit
71 control panel
72 external device
80 learning circuit
81 input unit
82 output unit
83, 83a weighting storage unit
84, 84a setting value storage unit
85, 85a perceptron circuit
91 multiplier
92 NOR circuit
93, 94, 95 AND circuit
96 OR circuit
100a, 100b, 100c numerical control

What is claimed is:

1. A machine learning model construction device comprising:
a learning circuit including hardware configured to construct a neural network model according to a setting value including at least a flag representing a value of "1" for a case in which a perceptron among a plurality of perceptrons in the learning circuit is not used, and a value of "0" for a case in which a perceptron among the plurality of perceptrons in the learning circuit is used; and
a control circuit including hardware configured to calculate the setting value as a value for constructing a predetermined neural network model in the learning circuit,
wherein the control circuit constructs a neural network model in the learning circuit by setting an output of a multiplier in each perceptron included in the learning circuit to any one of a value arrived at by multiplying a weighting value by an input of the multiplier, a value input to the multiplier, and a value of zero, according to the setting value, and setting a sum total of outputs of multipliers in each perceptron as the output of each perceptron.

2. A machine learning model construction device according to claim 1, wherein the control circuit receives input of a parameter value, defines a neural network model corresponding to the received parameter value as the predetermined neural network model, and calculates the setting value as the value for constructing the predetermined neural network model in the learning circuit.

3. A machine learning model construction device according to claim 2, wherein the neural network further includes a layer number and a dimension number, and the received parameter value is a value designating the layer number of the neural network model and the dimension number of each layer.

4. A machine learning model construction device according to claim 2, wherein the control circuit reads the parameter value from a setting file.

5. A machine learning model construction device according to claim 2, wherein the control circuit draws a connection relationship of perceptrons according to the parameter value, and a graphical user interface for performing adjustment of the parameter value while a user references the connection relationship of the perceptrons, on a display.

6. A machine learning model construction device according to claim 1, wherein the control circuit allows a user to select a neural network model prepared in advance, defines the neural network model selected as the predetermined neural network model, and calculates the setting value as the value for constructing the predetermined neural network model in the learning circuit.

7. A numerical control for controlling a machine tool, the numerical control comprising the machine learning model construction device according to claim 1,
wherein the control circuit receives input of a parameter value for constructing a neural network model that is related to control of the machine tool in the learning circuit, sets a neural network model corresponding to the received parameter value as the predetermined neural network model, and calculates the setting value as the value for constructing the predetermined neural network model in the learning circuit.

8. A non-transitory computer-readable recording medium encoded with a machine learning model construction program for causing a computer to function as a control circuit of a machine learning model construction device which includes a learning circuit realized by hardware capable of constructing a neural network model according to a setting value including at least a flag representing a value of "1" for a case in which a perceptron among a plurality of perceptrons in the learning circuit is not used, and a value of "0" for a case in which a perceptron among a plurality of perceptrons in the learning circuit is used, the machine learning model construction program causing the control circuit to perform steps comprising:
- a step of controlling to calculate the setting value as a value for constructing a predetermined neural network model in the learning circuit, and
- a step of constructing a neural network model in the learning circuit, by setting an output of a multiplier in each perceptron included in the learning circuit, to any one of a value arrived at by multiplying a weighting value by an input of the multiplier, a value input to the multiplier, and a value of zero, according to the setting value, and setting a sum total of outputs of multipliers in each perceptron as the output of each perceptron.

9. A method of constructing a machine learning model performed by a machine learning model construction device including a learning circuit realized by hardware capable of constructing a neural network model according to a setting value including a flag representing a value of "1" for a case in which a perceptron among a plurality of perceptrons in the learning circuit is not used, and a value of "0" for a case in which a perceptron among the plurality of perceptrons in the learning circuit is used, the method comprising:
- a step of controlling to calculate the setting value as a value for constructing a predetermined neural network model in the learning circuit, and
- a step of constructing a neural network model in the learning circuit, by setting an output of a multiplier in each perceptron included in the learning circuit, to any one of a value produced by multiplying a weighting value by an input of the multiplier, a value input to the multiplier, and a value of zero, according to the setting value, and setting a sum total of outputs of multipliers in each perceptron as the output of each perceptron.

* * * * *